United States Patent
Nakamura et al.

(10) Patent No.: US 6,920,173 B2
(45) Date of Patent: Jul. 19, 2005

(54) SPREAD-SPECTRUM SIGNAL RECEIVER APPARATUS AND INTERFERENCE CANCELLATION APPARATUS

(75) Inventors: Tadashi Nakamura, Kawasaki (JP); Tetsuhiro Futami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 759 days.

(21) Appl. No.: 10/033,196

(22) Filed: Dec. 28, 2001

(65) Prior Publication Data

US 2002/0136278 A1 Sep. 26, 2002

(30) Foreign Application Priority Data

Mar. 26, 2001 (JP) ........................................ 2001-087743

(51) Int. Cl.[7] .......................... H04B 1/69; H04B 1/707; H04B 1/713
(52) U.S. Cl. ........................ 375/148; 375/147; 375/316
(58) Field of Search .................................. 375/148, 225

(56) References Cited

U.S. PATENT DOCUMENTS

2003/0179814 A1 * 9/2003 Juntti et al. .................. 375/148

FOREIGN PATENT DOCUMENTS

JP          2000269932          9/2000

* cited by examiner

Primary Examiner—Stephen Chin
Assistant Examiner—Jia Lu
(74) Attorney, Agent, or Firm—Katten Muchin Zavis Rosenman

(57) ABSTRACT

In a spread-spectrum signal receiver apparatus for receiving a spread-spectrum signal and demodulating transmit data from the signal, a receiver receives a spread-spectrum signal that has been spread by a spreading code comprising a combination of a first code that varies depending upon spreading factor and a second code that differs for every user, an interference canceller produces a replica of an interference signal from the receive signal using a despreading code comprising a combination of the first code, which is regarded as a code decided based upon a minimum spreading factor, and the second code that differs for every user, and a receive modulator demodulates transmit data from a signal obtained by subtracting the replica from the receive signal.

11 Claims, 22 Drawing Sheets

SF1>SF2>SF3>SF4>SF5=MINIMUM SF

FIG. 16 PRIOR ART
(A)
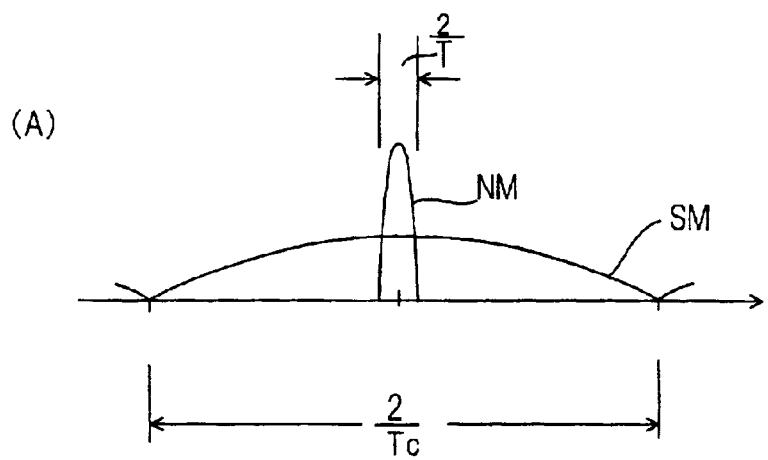
(B)
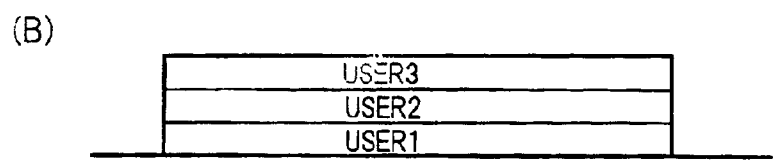
(C)
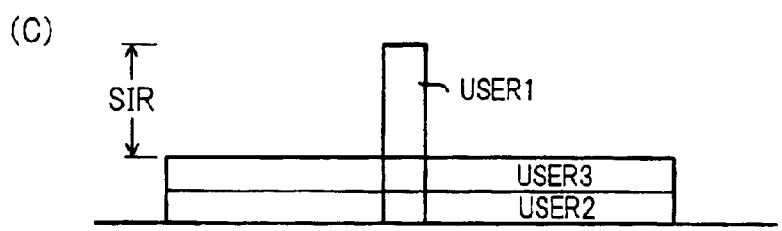
(D)
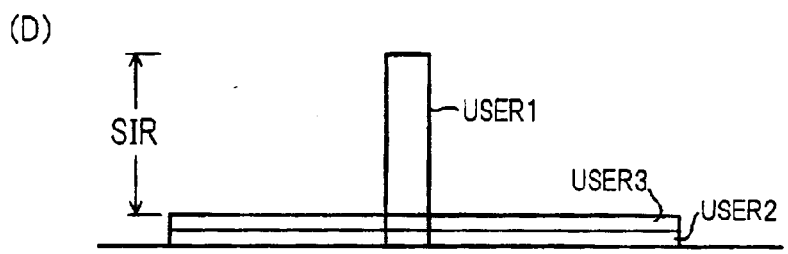

FIG. 19 PRIOR ART

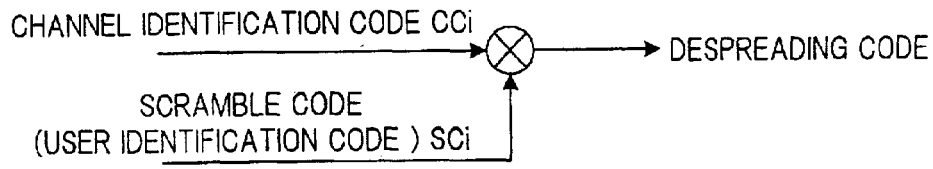

FIG. 20A PRIOR ART

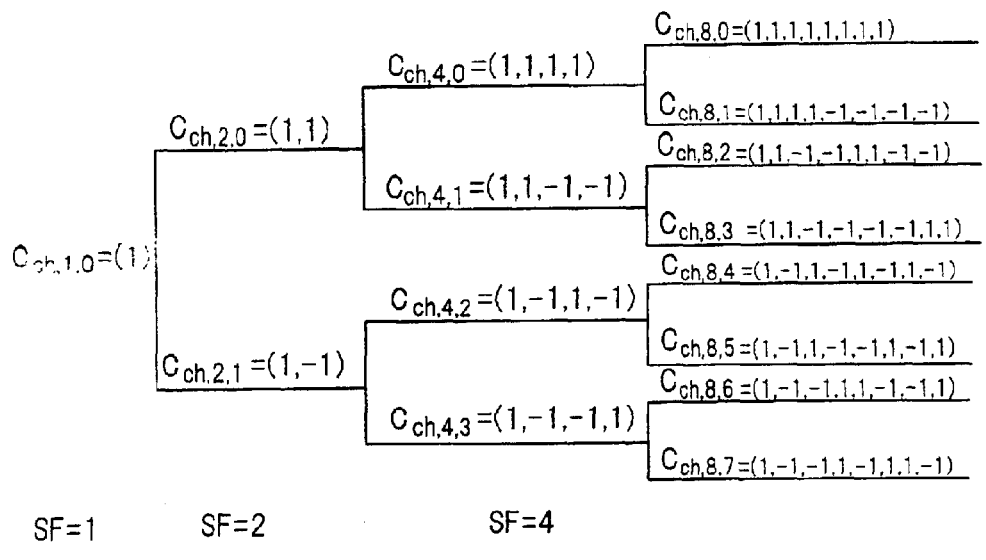

FIG. 20B PRIOR ART $$C_{ch,1,0} = 1$$

$$\begin{bmatrix} C_{ch,2,0} \\ C_{ch,2,1} \end{bmatrix} = \begin{bmatrix} C_{ch,1,0} & C_{ch,1,0} \\ C_{ch,1,0} & -C_{ch,1,0} \end{bmatrix} = \begin{bmatrix} 1 & 1 \\ 1 & -1 \end{bmatrix}$$

$$\begin{bmatrix} C_{ch,2(n+1),0} \\ C_{ch,2(n+1),1} \\ C_{ch,2(n+1),2} \\ C_{ch,2(n+1),3} \\ \vdots \\ C_{ch,2(n+1),2(n+1)-2} \\ C_{ch,2(n+1),2(n+1)-1} \end{bmatrix} = \begin{bmatrix} C_{ch,2^n,0} & C_{ch,2^n,0} \\ C_{ch,2^n,0} & -C_{ch,2^n,0} \\ C_{ch,2^n,1} & C_{ch,2^n,1} \\ C_{ch,2^n,1} & -C_{ch,2^n,1} \\ \vdots & \vdots \\ C_{ch,2^n,2^n-1} & C_{ch,2^n,2^n-1} \\ C_{ch,2^n,2^n-1} & -C_{ch,2^n,2^n-1} \end{bmatrix}$$

FIG. 21 PRIOR ART

FOR SPREADING FACTOR SF (=16)

| SYMBOL DATA | Data1 | Data2 |
|---|---|---|
| CHANNEL IDENTIFICATION CODE | "0011001100110011" | "0011001100110011" |

FOR SPREADING FACTOR $SF_{min}$ (=4)

| SYMBOL DATA | Data1 | Data2 | Data3 | Data4 | Data5 | Data6 | Data7 | Data8 |
|---|---|---|---|---|---|---|---|---|
| CHANNEL IDENTIFICATION CODE | "0011" | "0011" | "0011" | "0011" | "0011" | "0011" | "0011" | "0011" |

$SF/SF_{min}$

SPREAD-SPECTRUM SIGNAL RECEIVER APPARATUS AND INTERFERENCE CANCELLATION APPARATUS

BACKGROUND OF THE INVENTION

This invention relates to an spread-spectrum signal receiver apparatus and to an interference cancellation apparatus. More particularly, the invention relates to a spread-spectrum signal receiver apparatus for receiving a spread-spectrum signal, which has been spread by a spreading code comprising a combination of a first code decided by a spreading factor and a second code that differs for every user, and demodulating transmit data from the received signal, and to an interference cancellation apparatus for generating a replica of an interference signal from the received signal.

In spread-spectrum communications, W-CDMA (Wideband Code Division Multiple Access), which employs direct-sequence spreading, is one of the third-generation mobile communications systems the standardization of which is being forwarded by the 3GPP.

With CDMA, as shown in FIG. 10, a mobile station, which is a spread-spectrum signal transceiver, has a first modulator 1a for applying BPSK modulation (see FIG. 11) to control data that includes pilot data, and a first spreader 1b for applying spread-spectrum modulation using a spreading code for the control data. The mobile station further includes an encoding circuit 1c for subjecting the transmit data (user data) to suitable encoding such as convolutional coding, a second modulator 1d for subsequently applying BSPK modulation and a second spreader 1e for spreading the resultant signal using a spreading code for the user data. The mobile station further includes a multiplexer 1f for mapping the control data and user data, which have been spread by the first and second spreaders, as an I-axis component (I-channel component) and Q-axis component (Q-channel component) of an I-Q complex plane, as illustrated in FIG. 11, and multiplexing the resulting signals, and a radio transmitter unit 1g for subjecting the multiplexed signal to frequency conversion and high-frequency amplification and transmitting the resulting signal from an antenna 1h. It should be noted that the I and Q channels are referred to also as data and control channels, respectively. The spreading codes used in the first and second spreaders 1a, 1e are obtained by multiplying a user identification code (long code) and a channel identification code (short code), which is for identifying the data channel or control channel.

An uplink signal from the mobile station to a base station has a frame format shown in FIG. 12. One frame has a duration of 10 ms and is composed of 15 slots $S_0$ to $S_{14}$. User data is mapped to the I channel (data channel) and control data, which is data other than the user data, is mapped to the Q channel (control channel). Each of the slots $S_0$ to $S_{14}$ of the data channel that transmits the user data is composed of n bits, where n varies depending upon the transmission rate. The transmission rate will be 7.5 (=5×15/10×10$^{-3}$) kbps if n=5 holds and 30 kbps if n=20 holds.

Each slot of the control channel that transmits the control data is composed of 10 bits, and the transmission rate is a constant 15 kbps. Each slot transmits a pilot, transmission-power control data TPC, a transport format combination indicator TFCI and feedback information FBI. The pilot is utilized on the receive side for synchronous detection and SIR measurement, the TPC is utilized for control of transmission power, the TFCI transmits the transmission rate of the data and the number of bits per frame, etc., and the FBI is for controlling transmission diversity at the base station. It should be noted that the data transmission rate and the spreading factor have a 1:1 relationship, and that the spreading factor of the data channel is found from the transmission rate.

Thus, there are instances where the transmission rates on the data and control channels differ. In such case the spreading factor [=(symbol period)/(chip period)] on the data channel differs from that on the control channel. For example, (1) if the transmission rate of the data channel is lower than that (15 kbps) of the control channel, then the spreading factor of the data channel will be larger than that of the control channel, and (2) if the transmission rate of the data channel is higher than that (15 kbps) of the control channel, then the spreading factor of the data channel will be smaller than that of the control channel. The larger the spreading factor, the higher the process gain. Accordingly, in a W-CDMA system, transmission power for which the spreading factor is larger is reduced to lower the total transmission power. In other words, with W-CDMA, the control and data channels are subjected to BPSK modulation to effect spread-spectrum modulation at powers that differ from each other, the spread-spectrum modulated signals are mapped on an I-Q complex plane and multiplexed and the multiplexed signal is transmitted.

If, by way of example, the spreading factor of the data channel is larger than that of the control channel, then, as shown in FIG. 13, the apparatus of FIG. 10 is further provided with multipliers 1h, 1i, the multiplier 1h multiplies the BPSK modulation output of the second modulator id of the data channel by βc (βc<1) and the multiplier 1i multiplies the BPSK modulation output of the first modulator 1a of the control channel by 1 (i.e., leaves this output unchanged). The first and second spreaders 1b, 1e thenceforth spread-spectrum modulate the outputs of the multipliers 1i, 1h, respectively, the multiplexer 1f maps the spread-spectrum modulated signals of the respective channels on the I-Q complex plane, as illustrated in FIG. 14A, and multiplexes the resultant signals, and the radio transmitter unit 1g subjects the multiplexed signal to a frequency conversion and high-frequency amplification and transmits the resulting signal from the antenna 1h. By thus lowering the transmission power of the channel having the larger spreading factor, the total transmission power can be controlled (reduced).

Further, if the spreading factor of the data channel is made smaller than that of the control channel, the multiplier 1h multiplies the BPSK modulation output of the second modulator 1d by 1 and the multiplier 1i multiplies the BPSK modulation output of the first modulator 1a by β. The multiplexer 1f maps the spread-spectrum modulated signals of the respective channels on the I-Q complex plane, as illustrated in FIG. 14B, and multiplexes the resulting signals. As a result, the total transmission power can be reduced by lowering the transmission power of the channel having the larger spreading factor.

FIG. 15 is a block diagram illustrating one channel of the receiver section of a base station. The base station has a radio unit 2a for frequency-converting a high-frequency signal received from an antenna ATN to a baseband signal; a quadrature demodulator 2b for subjecting the baseband signal to quadrature detection, converting the analog in-phase component (I component) and analog quadrature component (Q component) to digital data and distributing the data to a searcher 2c and fingers $2d_1$~$2d_n$. Upon receiving input of a direct-sequence signal (DS signal) that has been influenced by the multipath effect, the searcher 2c detects multipath interference by performing an autocorrelation operation using a matched filter and inputs despreading-start timing data and delay-time adjustment data of each path to the fingers $2d_1 \sim 2d_n$. A control-channel despreader 3a of each of the fingers $2d_1 \sim 2d_n$ subjects a direct wave or delayed wave that arrives via a prescribed path to despread processing using a code identical with the spreading code for the control channel, integrates the results of despreading, then applies delay processing that conforms to the path and outputs a control-data signal. A data-channel despreader 3b subjects a direct wave or delayed wave that arrives via a prescribed path to despread processing using a code identical with the spreading code for the data channel, integrates the results of despreading, then applies delay processing that conforms to the path and outputs a user-data signal.

A channel estimation unit 3c estimates the fading characteristic of the communication path using the pilot signal contained in the despread control-data signal, executes channel estimation which compensates for the effects of fading, and outputs a channel estimation signal. Channel compensation units 3d, 3e multiply the despread control-data signal and despread user-data signal by the complex-conjugate signal of the channel estimation signal to thereby compensate for fading.

A RAKE combiner 2e combines and outputs the control-data signals output from the fingers $2d_1 \sim 2d_n$. A decoder 2g applies error-correction decoding processing to the data that is output from the RAKE combiner 2e, decodes the control data that prevailed prior to encoding and outputs the decoded data. A RAKE combiner 2i of the data channel combines and outputs the user-data signals output from the fingers $2d_1 \sim 2d_n$, and a decoder 2m applies error-correction decoding processing to the data that is output from the RAKE combiner 2i, decodes the user data that prevailed prior to encoding and outputs the decoded data.

Thus, with the CDMA scheme, a prescribed code is assigned to a user and multiple users communicate simultaneously. However, because signals from other channels currently engaged in calls constitute interference, the number of channels (users) that can communicate simultaneously is limited. Interference suppression techniques such as interference cancellers and adaptive array antennas are effective in increasing channel capacity and research relating to these techniques is progressing.

If we let Tc represent the period (chip period) of a spreading code and let T represent the symbol period of a narrow-band modulated signal that undergoes modulation by the spreading code, then T/Tc will be the spreading factor. By applying spread-spectrum modulation to a narrow-band modulated signal NM, as shown in (A) of FIG. 16, the bandwidth is enlarged by a factor of T/Tc, as indicated by SM, as a result of which the energy is spread. As a consequence, if spread-spectrum modulated signals are emitted from the mobile stations of multiple users simultaneously, the signals overlap one another in the manner shown in (B) of FIG. 16. If a signal from one user, e.g., user 1, is demodulated from these overlapping signals by despreading, the result will be as shown in (C) of FIG. 16. The spread signals of users 2 and 3 constitute interference signals with respect to the narrow-band signal of user 1. The spectrum ratio of the narrow-band signal of user 1 to the interference signal is referred to as the Signal Interference Ratio (SIR). The larger the number of users, the smaller the SIR. This means that there is a limit upon the number of channels that can communicate simultaneously (i.e., that there is a limit upon channel capacity). An interference canceller seeks to enlarge the SIR and thereby increase channel capacity, or to reduce transmission power, by suppressing the spread signals of other users, as depicted in (D) of FIG. 16. Specifically, an interference canceller suppresses interference by generating a replica of an interference signal using the results of demodulating each of the receive signals and subtracting the replica from the receive signal.

FIG. 17 is block diagram illustrating a CDMA receiver of a base station having an interference canceller. Specifically, the receiver includes an interference canceller 101 and receive-signal demodulators 102a to 102k, which are for users 1 to k, respectively, provided for respective ones of receive channels. The interference canceller 101 is provided with interference cancellation units (ICU) $111_1 \sim 111_k$ corresponding to respective ones of the receive channels. The interference cancellation units $111_1 \sim 111_k$ generate interference replicas of chip rates from the receive signal and output the replicas. More specifically, each of the interference cancellation units $111_1 \sim 111_k$ multiplies the receive signal by a dispreading code, then discriminates data using the despread signal, lastly spreads the discriminated data again, thereby generating the interference replica. A combiner 112 combines the interference replica signals of the respective receive channels, a filter 113 limits the band of the combined interference replica signals, a delay unit 114 delays the receive signal for a length of time required for generation of an interference replica, and a subtractor 115 executes interference suppression by subtracting the combined interference replica from the receive signal. The interference cancellation units produce replicates (replicates of control data and replicates of user data) of the transmit signal having the symbol rate. These replicates are referred to as symbol replicas and are transmitted to the receive demodulator after interference is eliminated. As a result, not only is interference from other channels eliminated but so is interference from the multipath effect of the channel in question. The interference cancellation units $111_1 \sim 111_k$ are connected in parallel and shorten processing time by processing all channels simultaneously.

FIG. 18 is a diagram showing the structure of each of the interference cancellation units $111_1 \sim 111_k$ according to the prior art. Each interference cancellation unit includes a despreader 151 for multiplying the receive signal by a despreading code that is identical with the spreading code, thereby outputting a despread signal; a demodulator 152 for demodulating "1", "0" of user data and control data on the basis of the result of despreading; an attenuator 153 for attenuating the demodulated signal by multiplying the result of demodulation by a damping coefficient that conforms to the degree of reliability; a re-spreader 154 for spreading the demodulated signal again to thereby output an interference replica; a despread-information extraction unit 155 for identifying the spreading factor on the transmit side by collecting TFCI bits, which are contained in the control data, over the duration of one frame; and a symbol-replica interface 156 for creating and sending a symbol replica.

The despreader 151 has fingers $151_1$ to $151_n$. A searcher (not shown) detects multipath and inputs despread-start timing data and delay-time adjustment data of each path to the fingers $151_1$ to $151_n$. Each of the fingers $151_1$ to $151_n$, has a despread unit for a control channel DPCCH for subjecting the receive signal to despread processing using a code identical with the spreading code of the control channel, integrating the result of despreading, subsequently subjecting the resulting signal to delay processing that conforms to the path and outputting a control-data signal;

and a despread unit for a data channel DPDCH for subjecting the receive signal to despread processing using a code identical with the spreading code of the data channel, integrating the result of despreading, subsequently subjecting the resulting signal to delay processing that conforms to the path and outputting a user data signal.

A channel-estimation/AFC circuit 151b estimates the fading characteristic of the communication path using the pilot signal contained in the despread control-data signal output from a selector 151g, executes channel estimation in order to compensate for the effects of fading, and outputs a channel estimation signal. Channel compensation units 151c, 151d multiply the despread control-data signal and despread user-data signal by the complex-conjugate signal of the channel estimation signal to thereby compensate for fading. RAKE combiners 151e, 151f combine the despread signals, from which fading has been eliminated, output from the fingers and output the results to demodulators 152a, 152b, respectively. The demodulators 152a, 152b discriminate "1", "0" of the user data and control data based upon the signals output from the RAKE combiners 151e, 151f. Since the pilot signal is already known, a selector 153a outputs the control data upon replacing the demodulated pilot signal with the known pilot signal.

The attenuator 153 has multipliers 153b, 153c for multiplying the demodulated user data and control data by a first damping coefficient a that conforms to the degree of reliability, and multipliers 153d, 153e for multiplying the user data and control data by a second damping coefficient β that conforms to the degree of reliability, thereby applying damping. The damping coefficients α, β are set in advance based upon transmission power, the interference environment, etc., by way of example.

The symbol-replica interface 156 multiplies the output signals of the multipliers 153b, 153c by the channel estimation signal (complex signal) that is output from the channel-estimation/AFC circuit 151b, thereby adding on the fading characteristic of the transmission path, and sends the results of multiplication to the corresponding one of the receive demodulators 102a to 102k (see FIG. 17) as symbol-replica signals.

Multipliers 154a, 154b of each of the fingers $154_1$ to $154_n$ of the re-spreader 154 multiply the user data and control data output from the attenuator 153 by the channel estimation signal (complex signal), thereby adding on the fading characteristic of the transmission path. Re-spread units 154c, 154d spread the user data and control data, onto which fading has been added, by a code identical with the despreading code of the despreader 151, and outputs the spread signals. An adder 154e combines the spread signals, which are output from the respective fingers, by data channel and by control channel, thereby generating interference replicas that are input to the receive demodulators 102a to 102k of the succeeding stage.

The despread-information extraction unit 155 identifies the spreading factor on the transmit side by collecting TFCI bits, which are contained in the control data, over the duration of one frame and inputs the spreading factor to the despreading unit 151a. The latter decides the spreading code of the data channel based upon the spreading factor and performs despreading using this spreading code.

As shown in FIG. 19, the spreading code on the transmit side is the result of multiplying the user identification code (scramble code) SCi, which is for identifying the user, by a channel identification code CCi, which is for identifying the channel (data channel or control channel). The user identification code SCi is not dependent upon the spreading factor SF but the channel identification code CCi of the data channel is dependent upon the spreading factor SF and varies depending upon the spreading factor. It should be noted that the channel identification code of the control channel is fixed because the spreading factor is fixed. FIG. 20A shows a code tree useful in describing the relationship between spreading factor and channel identification code of the data channel, and FIG. 20B is a diagram useful in describing the relationship between channel identification codes of data channels for which $SF=2^n$ and $SF=2^{n+1}$ hold. Here a 1 in the brackets signifies "0" and a −1 signifies "1". Further, a channel identification code is expressed by $C_{ch,SF,k}$, where the suffix SF indicates the spreading factor and the suffix k the code number. If SF=4 holds, then four 4-bit channel identification codes $C_{ch,4,0}$ to $C_{ch,4,3}$ exist on the basis of FIG. 20A; if SF=8 holds, then eight 8-bit channel identification codes $C_{ch,8,0}$ to $C_{ch,8,7}$ exist. Channel identification codes similarly exist for other spreading factors.

In a case where there is only one data channel, the channel identification code of the data channel is $C_{ch,SF,k}$ (where k=SF/4 holds). If the spreading factor SF is equal to 4, therefore, then the channel identification code of the data channel will be $C_{ch,4,1}$ (1, 1, −1, −1); if SF=8 holds, the channel identification code of the data channel will be $C_{ch,8,2}$ (1, 1, −1, −1, 1, 1, −1, −1); if SF=16 holds, the channel identification code of the data channel will be $C_{ch,16,4}$ (1, 1, −1, −1, 1, 1, −1, −1, 1, 1, −1, −1, 1, 1, −1, −1). Thus, the channel identification code of the data channel varies depending upon the spreading factor SF. FIGS. 21(a) and (b) are diagrams useful in describing the relationship between data and channel identification code in a case where the spreading factor SF is equal to 16 [FIG. 21(a)] and a case where the spreading factor SF is equal to 4 [FIG. 21(b)].

Thus, since the spreading-factor information is included in the TFCI bits, the despread-information extraction unit 155 (FIG. 18) collects the TFCI bits over the duration of one frame to identify the spreading factor on the transmit side.

The transmission rate of the control channel is fixed at 15 kbps and the spreading factor of the control channel is fixed. The channel identification code of the control channel therefore is fixed, as mentioned above. For example, the channel identification code of the control channel is fixed and is $C_{ch,246,0}$. If the user identification code is decided at the time of a call, therefore, the spreading code of the control channel will be evident. However, the transmission rate of the data channel is variable, the spreading factor varies in dependence upon the transmission rate and the channel identification code varies, as mentioned above. Consequently, even though the user identification code is decided at the time of a call, the spreading code of the data channel is unknown until the spreading factor is ascertained.

Accordingly, first the despreading unit 151a despreads only the control channel, finds the spreading factor from the TFCI bits to decide the spreading code of the data channel and then starts despreading the data channel.

FIG. 22 is a diagram showing the structure of each of the receive demodulators 102a to 102k. Each of these demodulators includes fingers $121_1$ to $121_n$, RAKE combiners 122a, 122b of the data and control channels, respectively, decoders 123a, 123b of the data and control channels, respectively, and a despread-information extraction unit 124 for identifying and outputting the spreading factor on the transmit side. Each of the fingers $121_1$ to $121_n$ has a despreader 131 for outputting a despread signal of a signal (interference canceller output), which has been obtained by eliminating an interference signal from the receive signal, in sync with path timing that enters from a searcher (not shown). More specifically, the despreader of the control channel subjects the output signal of the interference canceller to despread processing using a code identical with the spreading code for the control channel, integrates the result of despreading, subsequently subjects the resulting signal to delay processing that conforms to the path and outputs the processed signal. Further, the despreader of the data channel subjects the output signal of the interference canceller to despread processing using a code identical with the spreading code for the data channel, integrates the result of despreading, subsequently subjects the resulting signal to delay processing that conforms to the path and outputs the processed signal.

Combiners 132a, 132b generate transmit signals on the transmit side by adding the symbol replicas of the data and control channels DPDCH, DPCCH to the despread signals of the data and control channels, respectively. A channel-estimation/AFC circuit 133 estimates the fading characteristic of the communication path based upon a pilot signal that enters from a selector 135, and channel correction units 134a, 134b apply channel correction processing to the signals output from the combiners 132a, 132b, respectively, using the respective channel estimation signals, thereby eliminating fading. The RAKE combiners 122a, 122b combine the data signals and control signals, respectively, output from the respective fingers and from which fading has been eliminated, and input the combined signals to the decoders 123a, 123b, respectively. The decoders 123a, 123b apply error correction processing to the user-data signal and control-data signal output from the RAKE combiners 122a, 122b, decode the user data and control data that prevailed prior to encoding and output the decoded data.

The despread-information extraction unit 124 identifies the spreading factor on the transmit side by collecting TFCI bits, which are contained in the control data, over the duration of one frame and inputs the spreading factor to the despreading unit 131. The latter decides the spreading code of the data channel based upon the spreading factor. Furthermore, the despreading unit 131 first despreads only the control channel, finds the spreading factor from the TFCI bits to decide the spreading code of the data channel and then starts despreading the data channel.

Thus, in accordance with an interference canceller, interference can be suppressed by generating the replica of an interference signal and subtracting the replica from the receive signal. This makes it possible to enlarge channel capacity or to reduce transmission power.

The conventional interference canceller is such that if notification of the spreading factor is given in advance, delay can be made several symbols or less. However, in a communication environment in which the amount of data, i.e., the data speed, changes from time to time, as in the case of packet communication, the spreading factor varies from frame to frame or from slot to slot. In such case the spreading factor of the data channel will not be clarified and the channel identification code will not be determined unless the control data (TFCI bits) in one frame or one slot is demodulated. In other words, the conventional interference canceller cannot execute despread processing with regard to the data channel until the channel identification code is clarified. This means that a processing delay in frame or slot units occurs. Consequently, when transmission power control is carried out using TPC (Transmission Power Control), there tends to be an increase in control loop delay and the capacity characteristic deteriorates.

FIG. 23 shows an example of the general construction of the despreading unit 151a in a case where the spreading factor of the data channel DPDCH cannot be identified unless the control information on the control channel DPCCH is demodulated. The despreading unit 151a includes a multiplier circuit 151a-1 for spreading the receive signal by a spreading code $C_{DPCCH}$ for the control channel, a multiplier circuit 151a-2 for spreading the receive signal by a spreading code $C_{DPDCH}$ for the data channel, a delay circuit 151a-3 for delaying the receive signal, and a spreading-code generator 151a-4 for generating the spreading codes $C_{DPCCH}$, $C_{DPDCH}$ for the control and data channels, respectively.

In the case of the data channel DPDCH, it is necessary to delay the receive signal until the spreading factor is clarified by the TFCI bit and the spreading code $C_{DPDCH}$ for the data channel is determined. The delay circuit 151a-3 is provided for this purpose. Since this delay is a frame or slot delay (the delay differs depending upon the units in which the control information is multiplexed), the delay has a major effect upon TPC (Transmission Power Control).

FIG. 24 is a time chart associated with the block diagram shown in FIG. 23. Here SFi signifies the spreading factor. The spreading factor of the control channel DPCCH is SF1 and is fixed, whereas the spreading factor of the data channel DPDCH takes on various values. In FIG. 24, the control information is multiplexed in frame units. In the interference canceller, the receive signal is delayed by one frame or more until the spreading factor SF is identified and despreading of the data channel is begun. Thereafter, in order to produce an interference replica, a large delay of one frame or more occurs to start interference removal.

SUMMARY OF THE INVENTION

Accordingly, an object of the present invention is to shorten delay time in an interference canceller to a delay time on the order of symbol units.

Another object of the present invention is to shorten delay in the interference canceller of a CDMA system that uses a communication format of the type in which the spreading factor cannot be identified unless the control information of the frame or slot is demodulated.

Another object of the present invention is to prevent erroneous interference removal by so arranging it that removal of interference is not carried out in a case where data on the data channel DPDCH is not being received.

A further object of the present invention is to so arrange it that a prescribed coefficient βc can be reflected in an interference replica in a case where the coefficient βc, which conforms to the spreading factor of the data channel DPDCH and the spreading factor of the control channel DPCCH on the transmit side, is used to multiply the signal on one of the channels and the resulting signal is transmitted.

A further object of the present invention is to so arrange it that a highly precise interference replica is generated by estimating the spreading factor SF from the power ratio between the data channel DPDCH and the control channel DPCCH using a spreading-factor estimation unit, and producing an interference replica using the spreading factor having the higher degree of certainty.

According to a first aspect of the present invention, the foregoing objects are attained by providing a spread-spectrum signal receiver apparatus for receiving a spread-spectrum signal and demodulating transmit data from the signal, comprising: (1) a receive unit for receiving a spread-spectrum signal that has been spread by a spreading code comprising a combination of a first code that varies depending upon spreading factor and a second code that differs for every user; (2) an interference canceller for producing a replica of an interference signal from the receive signal using a despreading code comprising a combination of the first code, which is regarded as a code decided based upon a minimum spreading factor, and the second code that differs for every user, and generating a signal obtained by subtracting the replica from the receive signal; and (3) a demodulator for demodulating transmit data, from the signal from which the replica has been subtracted, by despread processing using a spreading code on the transmit side.

The first code (channel identification code) decided based upon the spreading factor is obtained by systematically repeating a code that conforms to a minimum spreading factor $SF_{min}$. In the present invention, therefore, the first code is regarded as a code decided based upon the minimum spreading factor and despreading necessary for cancellation of interference is performed using a despreading code comprising a combination of the first code and the second code that differs from user to user. If this arrangement is adopted, it will not be necessary for the interference canceller to decide the spreading code after identifying the spreading factor from the control information (TFCI bits). This makes it possible to shorten delay time till generation of the interference replica.

According to a second aspect of the present invention, the foregoing objects are attained by providing an interference cancellation apparatus for receiving a spread-spectrum signal that has been spread by a spreading code comprising a combination of a first code that varies depending upon spreading factor and a second code that differs for every user, and generating a replica of an interference signal from the receive signal, the apparatus having a replica producing unit for producing a replica of the interference signal from the receive signal using a despreading code comprising a combination of the first code, which is regarded as a code decided based upon a minimum spreading factor, and the second code that differs for every user. The replica producing unit includes: (1) a despreader for despreading the receive signal using the despreading code comprising the combination of the first code, which is regarded as a code decided based upon a minimum spreading factor, and the second code that differs for every user; (2) a demodulator for demodulating transmit data from the despread signal; (3) an attenuator for multiplying the demodulated transmit data by a prescribed damping coefficient; and (4) a spreader for generating the replica by spreading the attenuated transmit data using a code identical with the despreading code.

In accordance with this interference cancellation apparatus, it is unnecessary to decide the spreading code after the spreading factor is identified from the control information (TFCI bits). This makes it possible to shorten delay time till generation of the interference replica.

Further, the replica producing unit is provided with a damping-coefficient altering unit for detecting that user data is not being transmitted on a data channel and making the damping coefficient, which conforms to the data channel DPDCH, equal to zero. If this expedient is adopted, removal of interference will not be carried out if data on the data channel DPDCH is not being received. This makes it possible to prevent erroneous interference cancellation.

Further, the replica producing unit is provided with a damping-coefficient altering unit for altering the damping coefficient of the data channel based upon the ratio of receive power on the data channel to receive power on the control channel. As a result, in a case where a coefficient $\beta c$ in accordance with the spreading factor of the data channel DPDCH and the spreading factor of the control channel DPCCH on the transmit side is used to multiply the signal on one of the channels and the resulting signal is transmitted, the coefficient $\beta c$ can be reflected in the interference replica.

Another replica producing unit according to the present invention includes: (1) a first despreader for despreading a receive signal using a despreading code comprising the combination of the first code, which is regarded as a code decided based upon a minimum spreading factor, and the second code that differs for every user; (2) a spreading-factor estimation unit for estimating the spreading factor SF on the transmit side; (3) a second despreader for generating a despread signal of the receive signal by integrating, m times, the result of despreading, which is output from the first despreader, based upon the despreading code conforming to the minimum spreading factor, where m (an integer) represents the ratio of the estimated spreading factor to the minimum spreading factor; (4) a demodulator for demodulating the transmit data from the despread signal; (5) an attenuator for multiplying the demodulated transmit data by a prescribed damping coefficient; and (6) a spreader for generating the replica by spreading the attenuated transmit data using a code identical with the despreading code. In accordance with this replica producing unit, the spreading factor SF can be estimated by a spreading-factor estimation unit from the power ratio between the data channel DPDCH and control channel DPCCH, and a highly precise interference replica can be generated by producing an interference replica using the more reliable spreading factor.

Other features and advantages of the present invention will be apparent from the following description taken in conjunction with the accompanying drawings.

BRIEF DESCRIPTION OF THE DRAWINGS

FIG. 16 is a diagram useful in describing interference cancellation;

FIG. 19 is a diagram useful in describing a spreading code according to the prior art;

FIGS. 20A, 20B are diagrams useful in describing a channel identification code according to the prior art;

FIG. 21 is a diagram useful in describing the relationship among spreading factor, data and channel identification codes according to the prior art;

Figure 1:
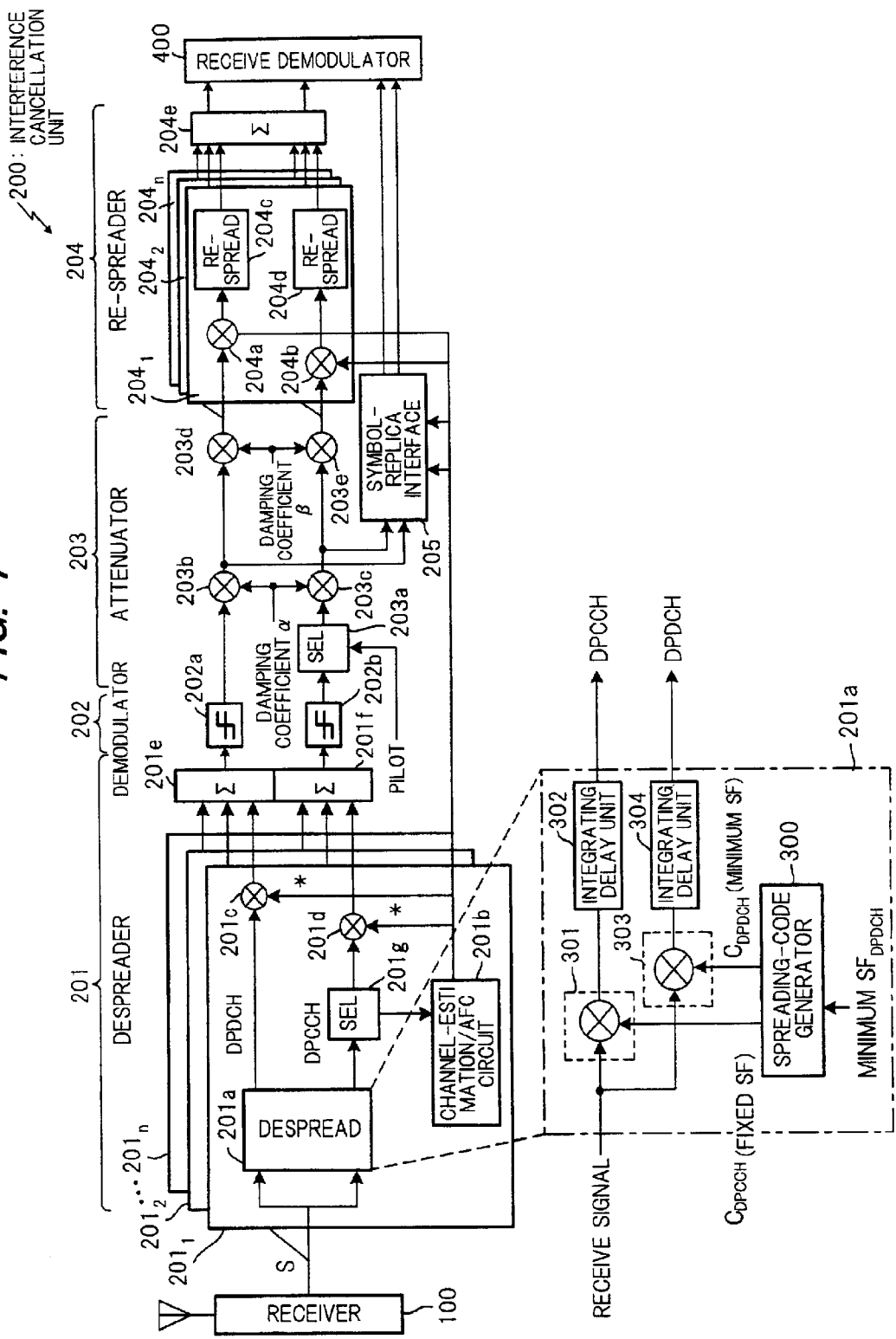
FIG. 1 is a diagram showing the structure of an interference cancellation unit according to a first embodiment of the present invention.

DESCRIPTION OF THE PREFERRED EMBODIMENTS (A) Principles

In general, the control channel DPCCH is such that the spreading factor is already known or fixed, while only the spreading factor of the data channel DPDCH varies. The present invention is such that if the spreading factor SF on the data channel is not known, a channel identification code is specified considering the spreading factor SF as being a minimum spreading factor $SF_{min}$, and a code obtained by multiplying this channel identification code and a user identification code together is adopted as the spreading code of the data channel. Despreading is performed using this spreading code, and an interference replica is produced. If this arrangement is adopted, the spreading code of the data channel can be acquired immediately and it is unnecessary to specify the spreading code upon obtaining spreading-factor information by collecting one frame or one slot of control data (TFCI bits), as is required in the prior art. This makes it possible to reduce delay.

As mentioned above, a channel identification code having the minimum spreading factor can be used as the channel identification code. The reason for this will now be described. In a case where there is only one data channel, the channel identification code is $C_{ch,SF,k}$ (where k=SF/4), as described above in connection with FIG. 20. That is, the channel identification code of a data channel for which minimum spreading factor $SF_{min}=4$ holds is (1, 1, −1, −1); the channel identification code of a data channel for which minimum spreading factor $SF_{min}=8$ holds is (1, 1, −1, −1, 1, −1, −1); and the channel identification code of a data channel for which minimum spreading factor $SF_{min}=16$ holds is (1, 1, −1, −1, 1, 1, −1, −1, 1, 1, −1, −1, 1, 1, −1, −1).

Accordingly, the relationship between the channel identification code of the data channel having the spreading factor SF and the channel identification code of the data channel having the minimum spreading factor $SF_{min}$ is such that the channel identification code of the data channel having the spreading factor SF is the result of repeating, $SF/SF_{min}$ times, the channel identification code of the data channel having the minimum spreading factor $SF_{min}$. Assume that the code of the minimum spreading factor $SF_{min}$ is "0011", where 1 and −1 have been restored to "0" and "1", respectively. The code regarding the spreading factor SF will then be an iteration, $SF/SF_{min}$ times, of the code "0011" of the spreading factor $SF_{min}$ as follows: "00110011 . . . 0011".

If the minimum spreading factor $SF_{min}$ is considered to be the reference, one symbol will be spread by "0011" and therefore symbol data varies every "0011". In the case of the spreading factor SF, on the other hand, one symbol is spread by "00110011 . . . 0011". When despreading is performed using the code "0011" of the minimum spreading factor $SF_{min}$, therefore, the symbol data of the same code will be demodulated $SF/SF_{min}$ times.

Accordingly, user data of the data channel can be demodulated using the channel identification code "0011" of the minimum spreading factor. In this case, the user data can be demodulated accurately if it is so arranged that the result of despreading is summed $SF/SF_{min}$ times and the "1"s and "0"s of the user data are demodulated by the result of this summing operation.

The foregoing relates to a case where the number of data channels is one and the code of the minimum spreading factor $SF_{min}$ is "0011". If the number of data channels is greater than one, however, the code of the minimum spreading factor $SF_{min}$ will be any one of "0011", "0101", "0110", as should be evident from FIG. 20. However, which code will be used is already known at the time of communication and therefore it will suffice merely to use this code.

(B) First Embodiment (a) Interference Cancellation Unit

Figure 17:
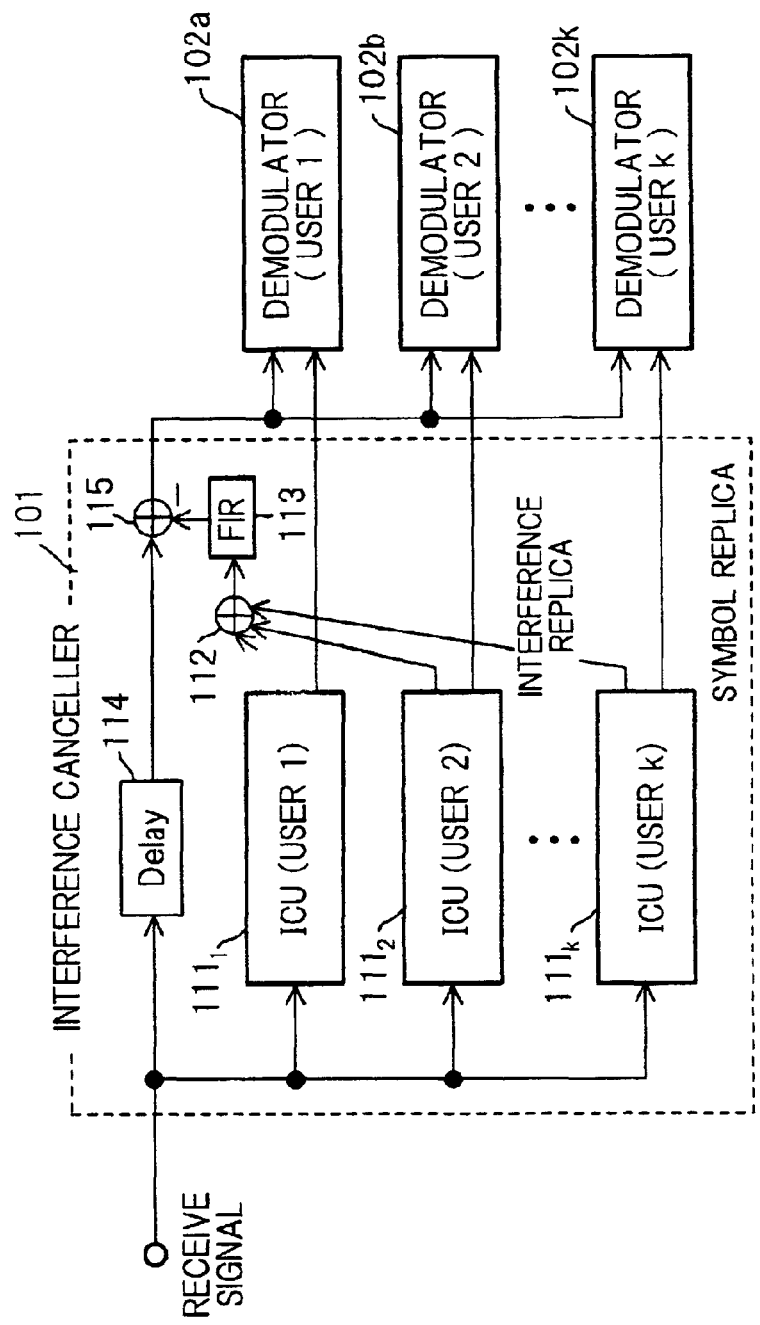
FIG. 17 is a block diagram of an interference canceller.
Figure 18:
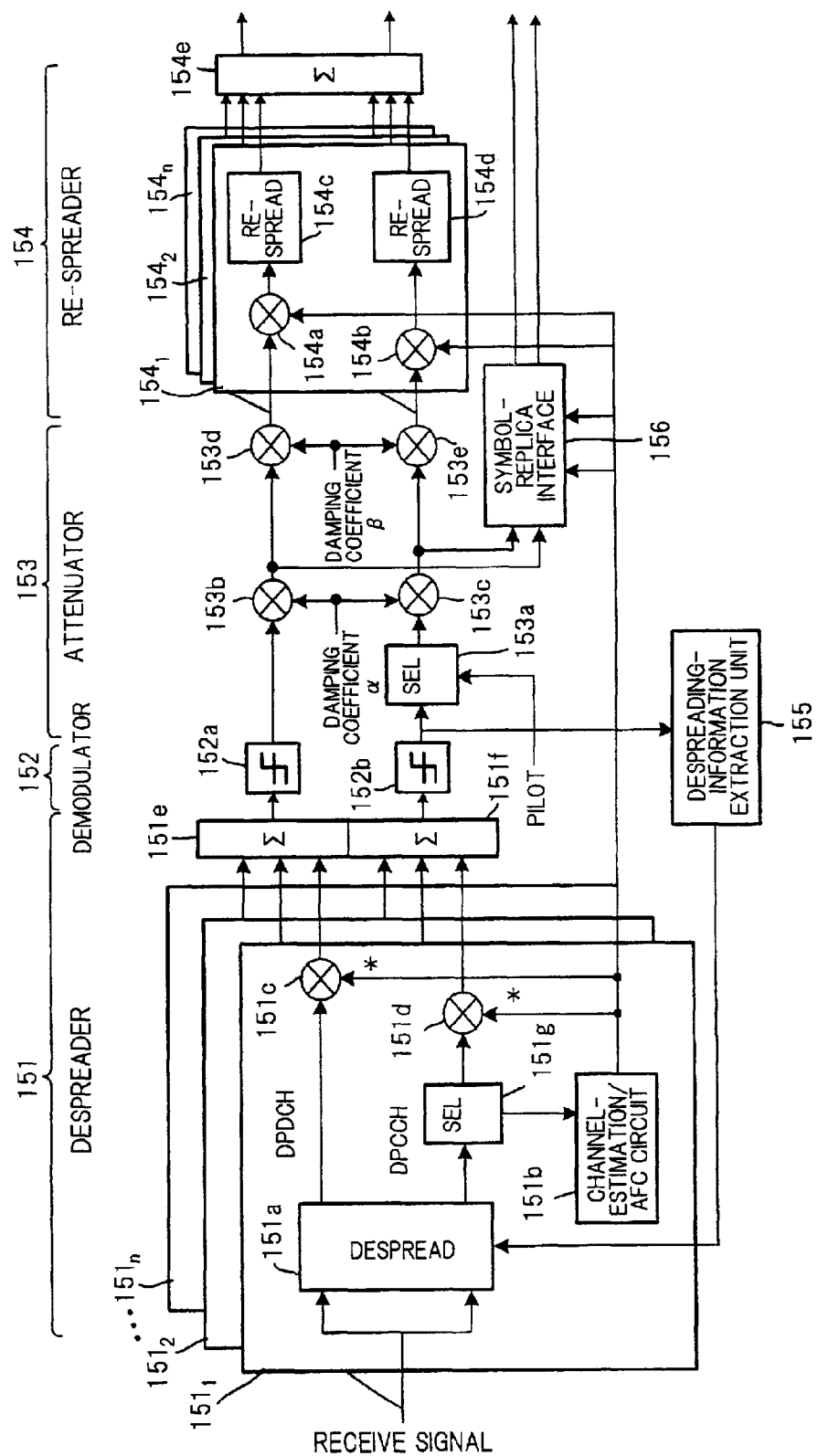
FIG. 18 is a diagram showing the structure of an interference cancellation unit according to the prior art.

FIG. 1 is a diagram showing the structure of an interference cancellation unit according to a first embodiment of the present invention. Shown are a receiver 100, an interference cancellation unit 200 according to this embodiment, and a receive demodulator 400. The interference cancellation unit 200 is provided for each user channel within the interference canceller (see FIG. 17); only one channel is shown in FIG. 1. The interference cancellation unit 200 includes a despreader 201 for multiplying a receive signal S by a despreading code that is identical with the spreading code, thereby outputting a despread signal; a demodulator 202 for demodulating "1", "0" of user data and control data on the basis of the result of despreading; an attenuator 203 for attenuating the demodulated signal by multiplying the result of demodulation by a damping coefficient that conforms to the degree of reliability; a re-spreader 204 for spreading the demodulated signal again to thereby output an interference replica; and a symbol-replica interface 205 for creating and sending a symbol replica.

The despreader 201 has fingers $201_1$ to $201_n$. A searcher (not shown) detects multipath and inputs despread-start timing data and delay-time adjustment data of each path to the fingers $201_1$ to $201_n$. A despreading unit $201a$ in each of the fingers $201_1$ to $201_n$ has a spreading-code generator 300 which generates (1) a spreading code $C_{DPCCH}$ for the control channel by multiplying a separately entered user identification code SCi and a control-channel identification code CCi together, and (2) a spreading code $C_{DPDCH}$ for the data channel by multiplying the user identification code SCi by a data-channel identification code of a minimum spreading factor $SF_{DPDCH}$ together.

A despreader 301 for the control channel despreads a direct wave or delayed wave, which arrives via a prescribed path, based upon a despread-start timing from the searcher by multiplying the wave by the spreading code $C_{DPCCH}$ for the control channel, and an integrating delay unit 302 integrates the results of despreading and then applies a delay that conforms to the path and outputs a control-data signal of the control channel DPCCH. A despreader 303 for the data channel similarly despreads a direct wave or delayed wave, which arrives via a prescribed path, by multiplying the wave by the spreading code $C_{DPDCH}$ for the data channel, and an integrating delay unit 304 integrates the results of despreading and then applies a delay that conforms to the path and outputs a control-data signal of the data channel DPDCH.

A channel-estimation/AFC circuit 201b estimates the fading characteristic of the communication path using the pilot signal contained in the despread control-data signal output from a selector 201g, and outputs a channel estimation signal. Channel compensation units 201c, 201d multiply the despread control-data signal and despread user-data signal by the complex-conjugate signal of the channel estimation signal to thereby compensate for fading. RAKE combiners 201e, 201f combine the despread signals (control-data signal and user-data signal), from which fading has been eliminated, output from the fingers and output the results to demodulators 202a, 202b, respectively. The demodulators 202a, 202b discriminate "1", "0" of the user data and control data based upon the signals output from the RAKE combiners 201e, 201f, respectively. Since the pilot signal is already known, a selector 203a outputs the control data upon replacing the demodulated pilot signal with the known pilot signal.

The attenuator 203 has multipliers 203b, 203c for multiplying the demodulated user data and control data, respectively, by a first damping coefficient a that conforms to the degree of reliability, and multipliers 203d, 203e for multiplying the user data and control data, respectively, by a second damping coefficient β that conforms to the degree of reliability, thereby applying damping. The damping coefficients α, β are set in advance based upon transmission power, the interference environment, etc., by way of example.

The symbol-replica interface 205 multiplies the output signals of the multipliers 203b, 203c by the channel estimation signal (complex signal) that is output from the channel-estimation/AFC circuit 201b, thereby adding on the fading characteristic of the transmission path, and sends the results of multiplication to the corresponding one of the receive demodulators of the user channel as symbol-replica signals.

Multipliers 204a, 204b of each of the fingers $204_1$ to $204_n$ of the re-spreader 204 multiply the user data and control data output from the attenuator 203 by the channel estimation signal (complex signal), thereby adding on the fading characteristic of the transmission path. A re-spread unit 204c for the data channel spreads the user data, onto which fading had been added, by the spreading code $C_{DPDCH}$ for the data channel and outputs the spread signal. A re-spread unit 204d for the control channel spreads the user data, onto which fading had been added, by the spreading code $C_{DPCCH}$ for the control channel and outputs the spread signal. An adder 204e combines the spread signals, which are output from the respective fingers, by data channel DPDCH and by control channel DPCCH, thereby generating an interference replica. This interference replica is combined with the interference replicas output from each of the interference cancellation units, the combined signal is subtracted from the receive signal and the resulting signal is input to the receive demodulator of the corresponding user channel.

Figure 2:
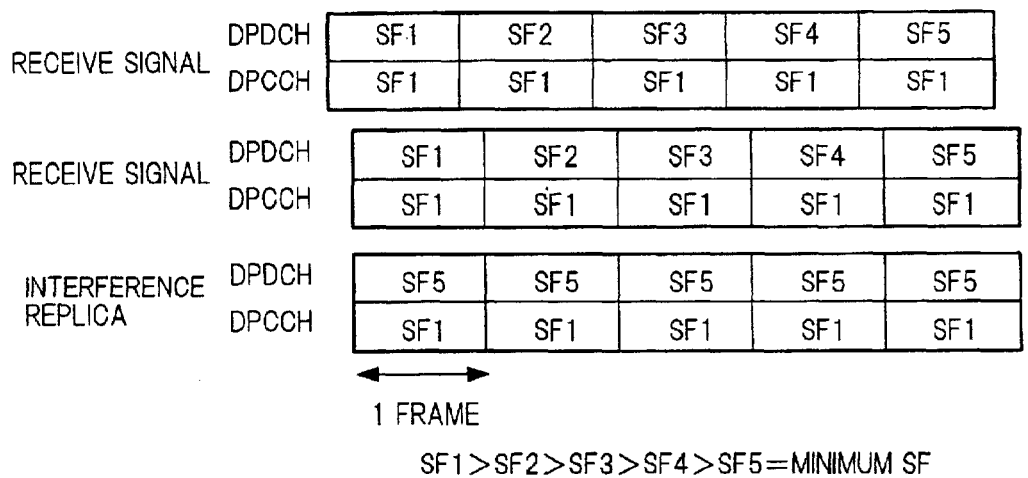
FIG. 2 is a diagram useful in describing the timings of a receive signal and interference replica according to the present invention.

FIG. 2 is a diagram useful in describing the timings of a receive signal and interference replica according to the present invention, where SFi represents the spreading factor. The spreading factor of the control channel DPCCH is SF1 and is fixed, whereas the spreading factor of the data channel DPDCH takes on various values. In FIG. 2, the control information is multiplexed in frame units. In the interference canceller according to the present invention, the spreading factor is considered to be the minimum spreading factor and the spreading code is generated using the code of the minimum spreading factor. As a result, it is unnecessary to find the spreading factor from the TFCI bits. Since it is therefore unnecessary to delay the receive signal in frame or slot units, it is possible to realize a short delay, i.e., a delay on the symbol order, so that a delay in control of transmission power can be eliminated.

(b) Receive Demodulator

Figure 22:
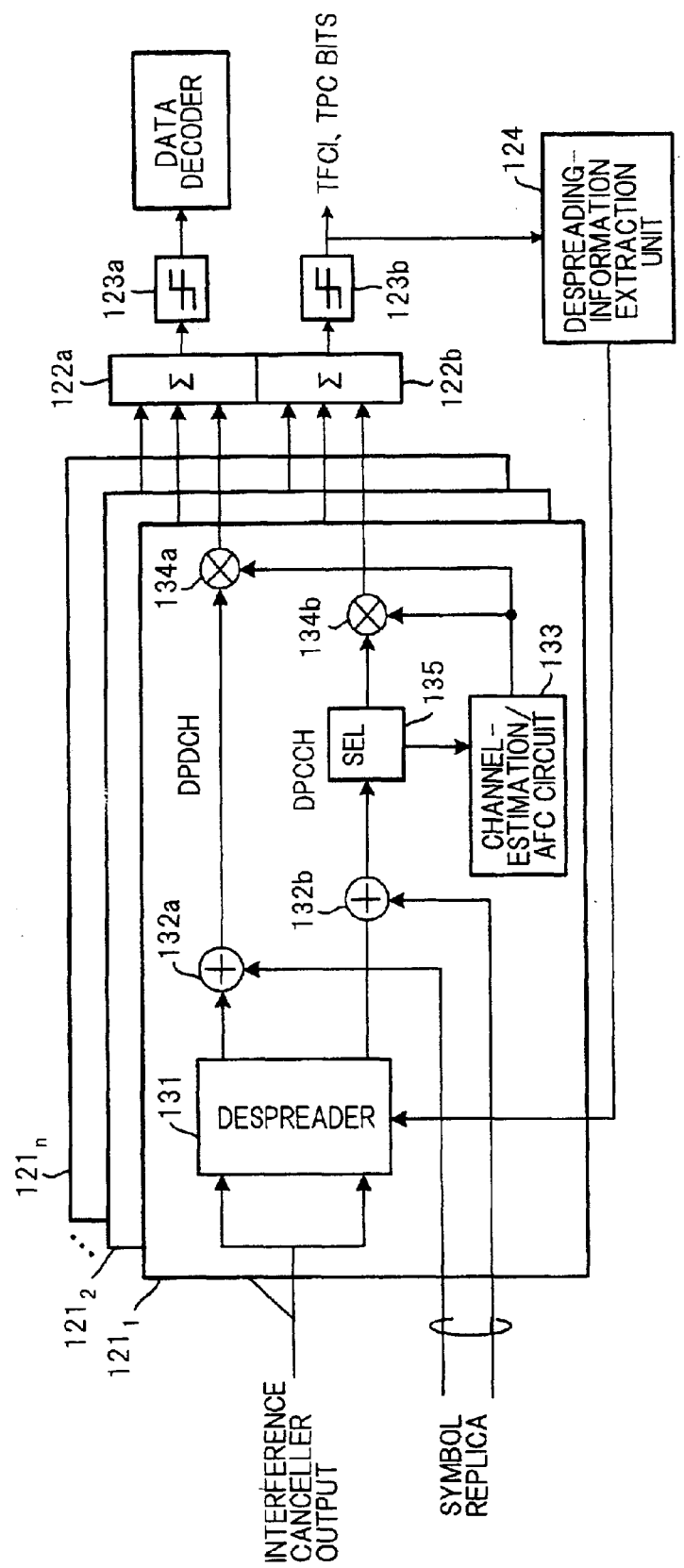
FIG. 22 is a block diagram of a receive demodulator according to the prior art.
Figures 23, 24:
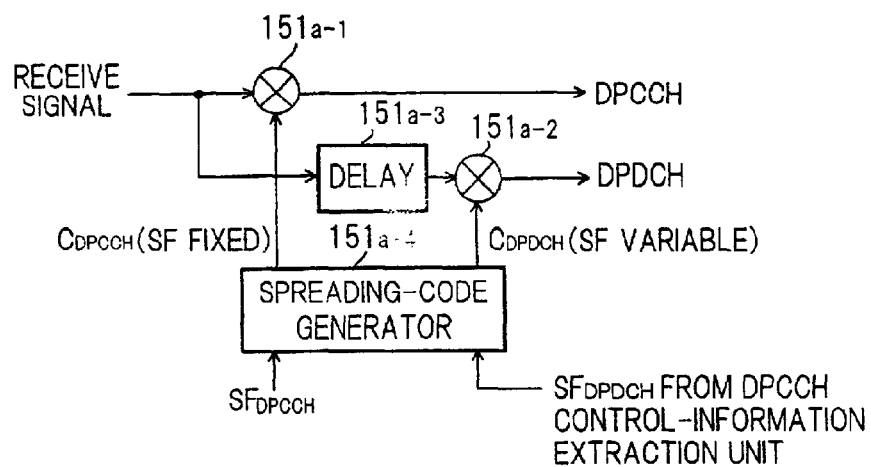
FIG. 23 is a diagram showing the structure of a conventional despreading unit in an interference cancellation unit.
FIG. 24 is a diagram useful in describing the timing of a receive signal and interference replica according to the prior art.

A structure similar to that of the prior art shown in FIG. 22 can be adopted as the receive demodulator. Even use of a receive demodulator so constructed will make it possible to eliminate delay in the loop of transmission power control as a result of shortening delay in the interference cancellation unit 200. With the arrangement of FIG. 22, however, it is necessary to specify the spreading code by obtaining the spreading factor from the TFCI bits in order to demodulate the user data. The result is a delay in data demodulation.

Figure 3:
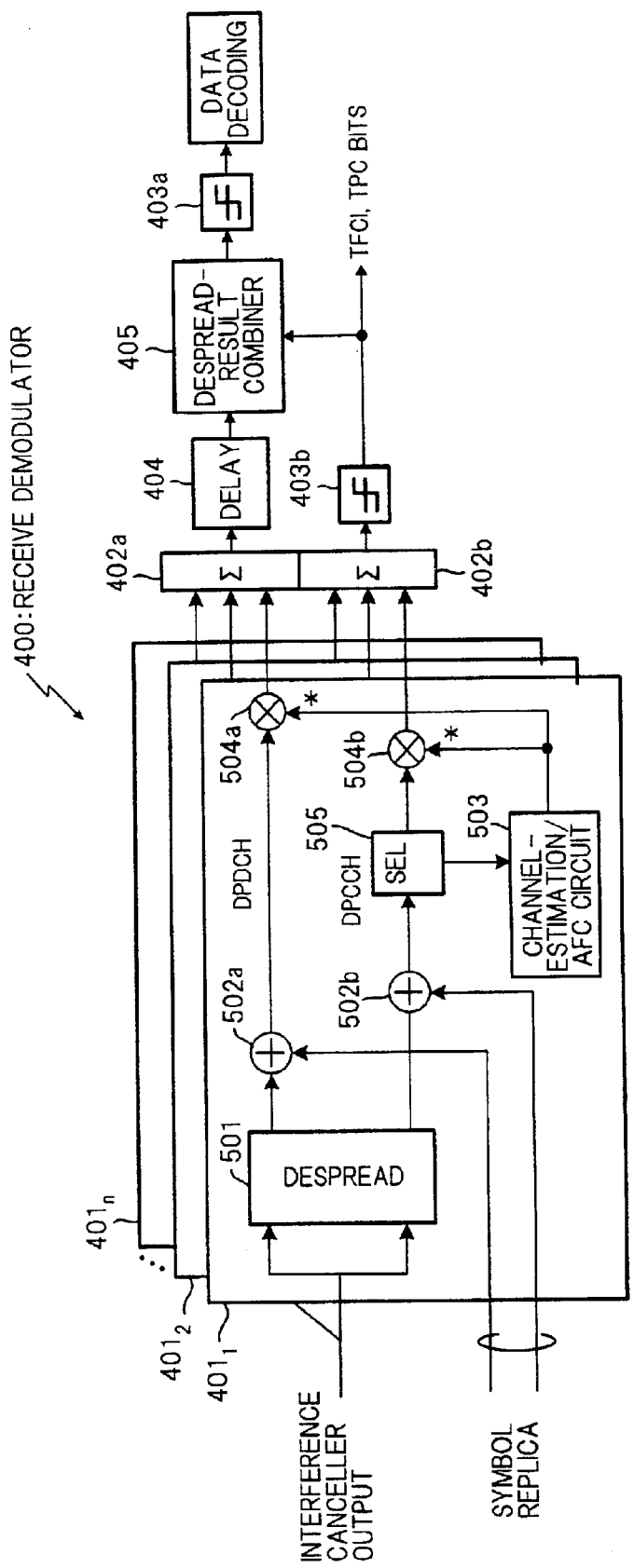
FIG. 3 is a diagram showing the structure of a receive demodulator according to the present invention.

FIG. 3 is a diagram showing the structure of a receive demodulator 400 according to the present invention. The receive demodulator 400 includes fingers $401_1$ to $401_n$, RAKE combiners 402a, 402b of the data and control channels, respectively, decoders 403a, 403b of the data and control channels, respectively, a delay unit 404 for delaying the output signal of the RAKE combiner 402a of the data channel until the spreading factor SF is found from the TFCI bits, and a despread-result combiner (second despreader) 405 for generating a despread signal of the receive signal by integrating the results of despreading m (=$SF/SF_{min}$) times, where $SF_{min}$ represents the minimum spreading factor.

Each of the fingers $401_1$ to $401_n$ has a despreader 501 the structure of which is identical with that of the despreader 201a of the interference cancellation unit (FIG. 1). More specifically, the despreader of the control channel subjects the output signal of the interference canceller to despread processing by multiplying this output signal by the spreading code $C_{DPCCH}$ for the control channel, integrates the result of despreading, subsequently subjects the resulting signal to delay processing that conforms to the path and outputs the processed signal. Further, the despreader of the data channel subjects the output signal of the interference canceller to despread processing by multiplying this output signal by the spreading code $C_{DPDCH}$ for the data channel, integrates the result of despreading, subsequently subjects the resulting signal to delay processing that conforms to the path and outputs the processed signal. In this case, the spreading code $C_{DPDCH}$ for the data channel is the result of multiplying the user identification code SCi by the data-channel identification code regarding the minimum spreading factor $SF_{min}$.

Combiners 502a, 502b generate transmit signals on the transmit side by adding the symbol replicas of the data and control channels DPDCH, DPCCH to the despread signals of the data and control channels DPDCH, DPCCH, respectively. A channel-estimation/AFC circuit 503 estimates the fading characteristic of the communication path based upon a pilot signal that enters from a selector 505, and channel correction units 504a, 504b apply channel correction processing to the signals output from the combiners 502a, 502b, respectively, using the respective channel estimation signals, thereby eliminating fading.

The RAKE combiners 402a, 402b combine the data signals and control signals, respectively, output from the respective fingers and from which fading has been eliminated, and output the combined. The delay unit 404 delays the output signal of the RAKE combiner 402a of the data channel until the spreading factor SF is found from the TFCI bits, and the decoder 403b applies error correction processing to the control-data signal output from the RAKE combiner 402b, decodes the control data that prevailed prior to encoding and outputs the decoded data. The despread-result combiner 405 obtains the spreading factor SF from the TFCI bits contained in the control data, generates a despread signal of the receive signal by integrating the results of despreading m (=SF/$SF_{min}$) times, and inputs the generated despread signal to the decoder 403a. The latter decodes and outputs the user data from the despread signal of the data channel.

In accordance with the receive decoder shown in FIG. 3, despreading of the data channel is begun immediately using the code conforming to the minimum spreading factor and the results of despreading are saved. When the spreading factor SF is clarified, the saved results of despreading are combined so that the user data of the data channel can be demodulated with only a slight delay.

(C) Second Embodiment

Figure 4:
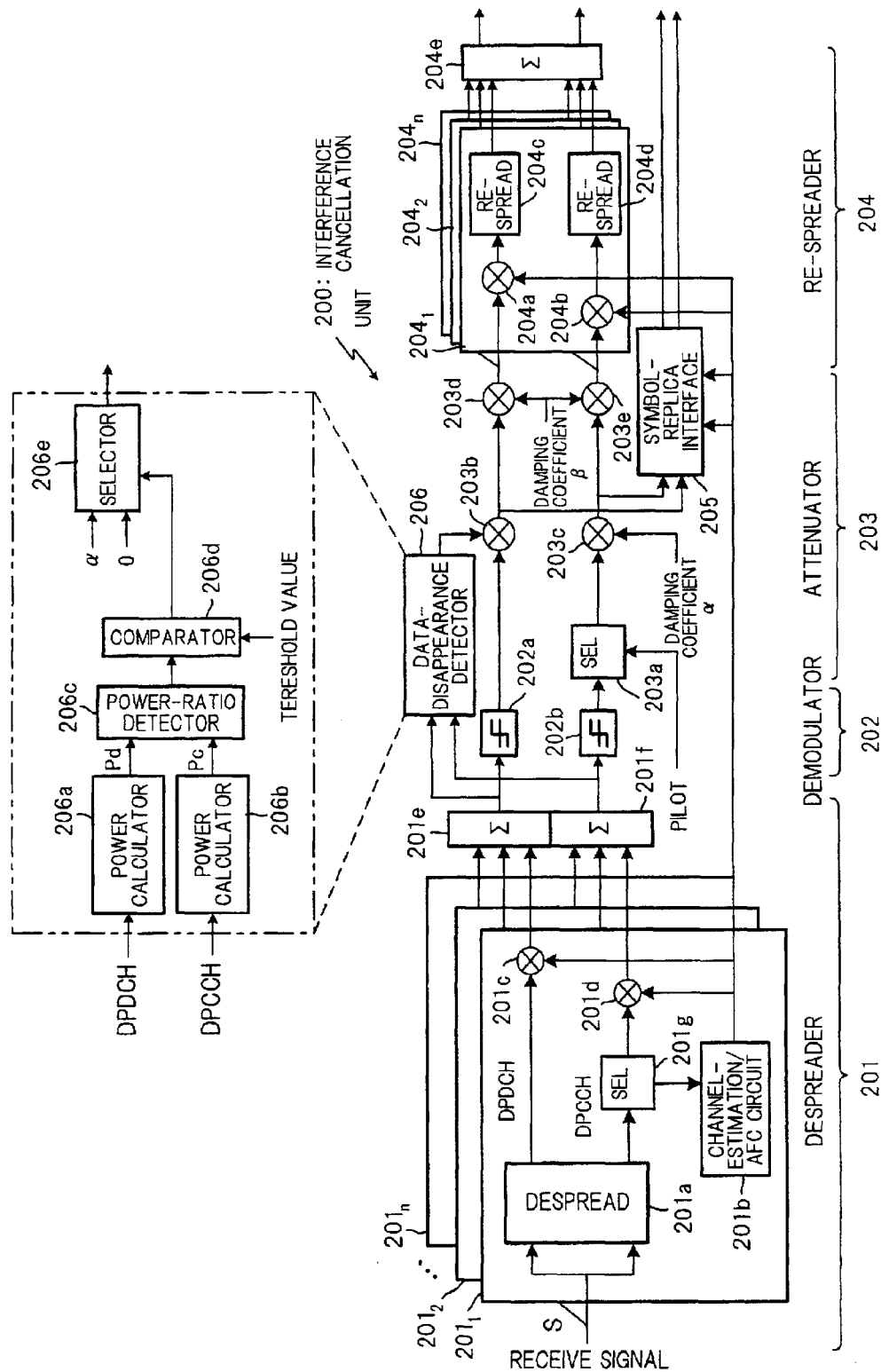
FIG. 4 is a diagram showing the structure of an interference cancellation unit according to a second embodiment of the present invention.

FIG. 4 is a diagram showing the structure of an interference cancellation unit according to a second embodiment of the present invention, in which components identical with those of the first embodiment in FIG. 1 are designated by like reference characters. This embodiment differs from the first in that a data-disappearance detector 206 for detecting disappearance of user data on the data channel is provided and the value of the first damping coefficient a on the side of the data channel DPDCH is controlled based upon the absence or presence of data.

In a packet mode, there are cases where no data is received solely on the data channel DPDCH. In such case, the data-disappearance detector 206 detects that user data is not being received and sets the value of the first damping coefficient α to "0" so that removal of interference will not be carried out. As a result, erroneous removal of interference can be prevented by not carrying out removal of interference in a slot or frame for which it has been determined that user data was not received on the data channel DPDCH.

Detection of data disappearance involves calculating power Pd of the data channel and power Pc of the control channel in power calculation units 206a, 206b, respectively, calculating a power ratio Pd/Pc by a power-ratio detector 206c, comparing the power ratio Pd/Pc with a set value in terms of size in a comparator 206d, deciding that user data has disappeared if the power ratio Pd/Pc is less than the set value, and deciding that user data exists if the power ratio Pd/Pc is equal to or greater than the set value. A selector 206e selects the first damping coefficient a and inputs it to the multiplier 203b of the attenuator 203 if user data exists, and selects 0 and inputs this to the multiplier 203b if user data does not exist.

The data-disappearance detector 206 of FIG. 4 is one example. An arrangement can also be adopted in which filters (matched filters or low-pass filters that pass only the symbol rates) corresponding to all spreading factors SF are provided and it is decided that user data has disappeared on the data channel DPDCH in a case where an output is not obtained from any filter whatsoever.

(D) Third Embodiment

Figure 5:
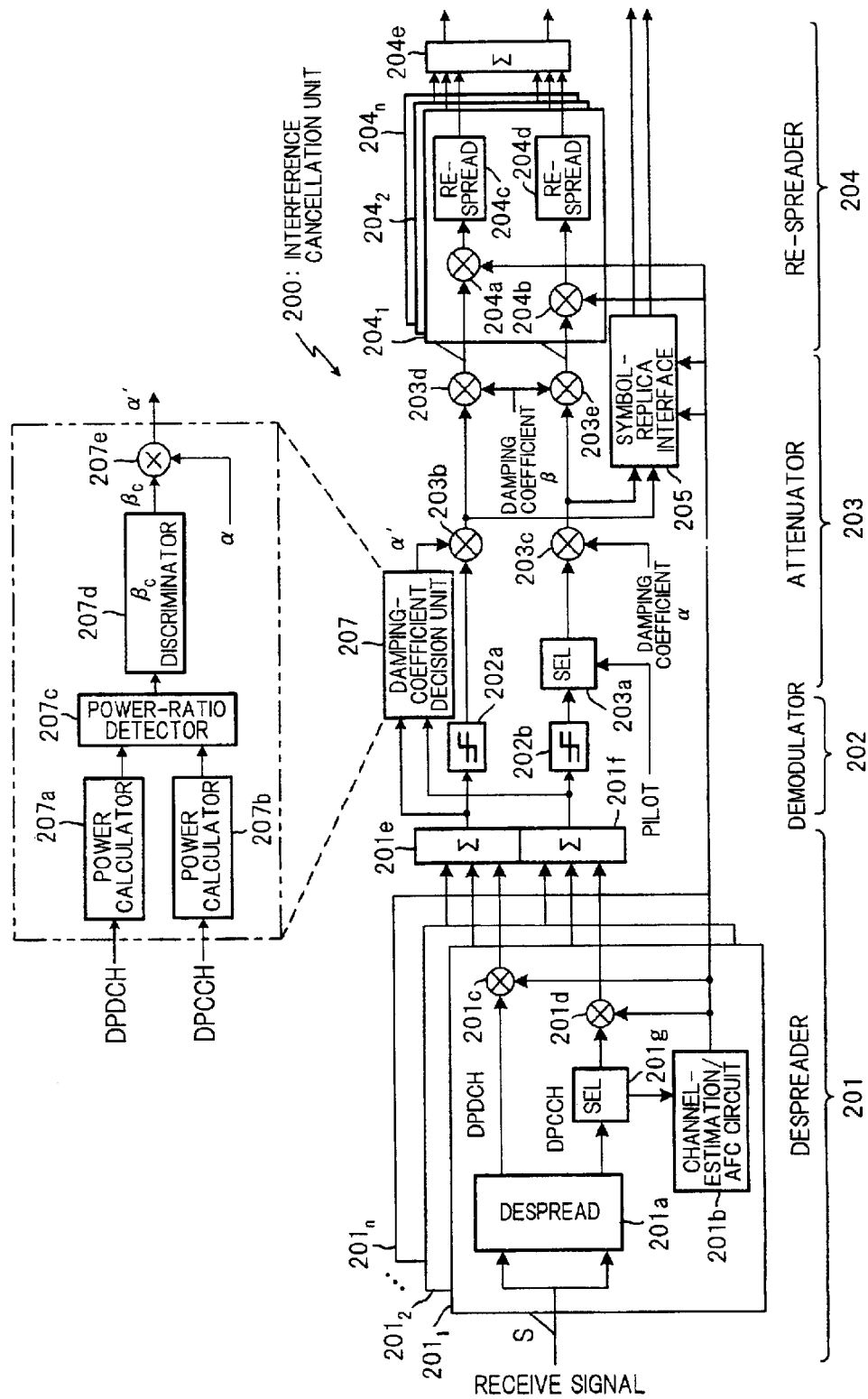
FIG. 5 is a diagram showing the structure of an interference cancellation unit according to a third embodiment of the present invention.

FIG. 5 is a diagram showing the structure of an interference cancellation unit according to a third embodiment of the present invention, in which components identical with those of the first embodiment in FIG. 1 are designated by like reference characters.

Figure 13:
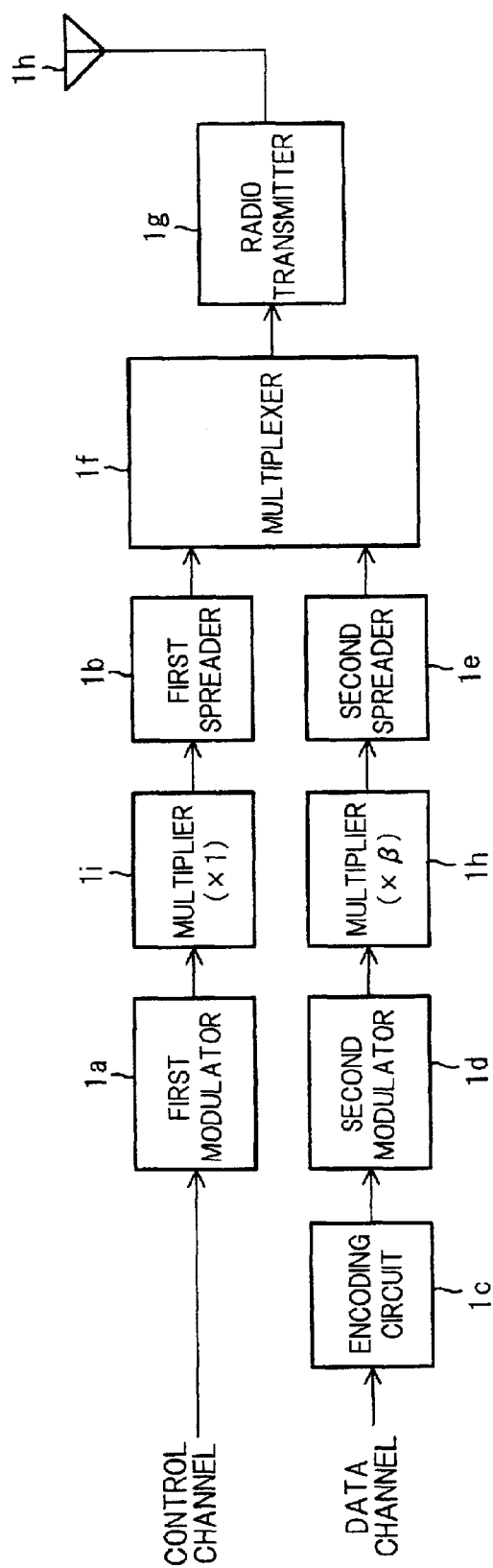
FIG. 13 is a block diagram of a mobile station in W-CDMA according to the prior art.
Figure 14A:
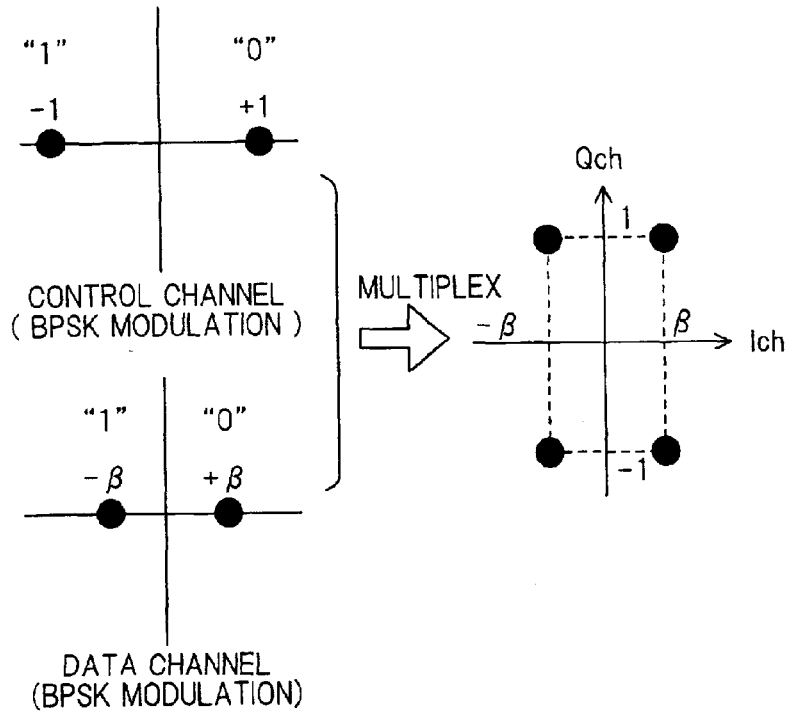
FIGS. 14A, 14B are diagrams useful in describing multiplexed signals in a complex plane according to the prior art.
Figure 14B:
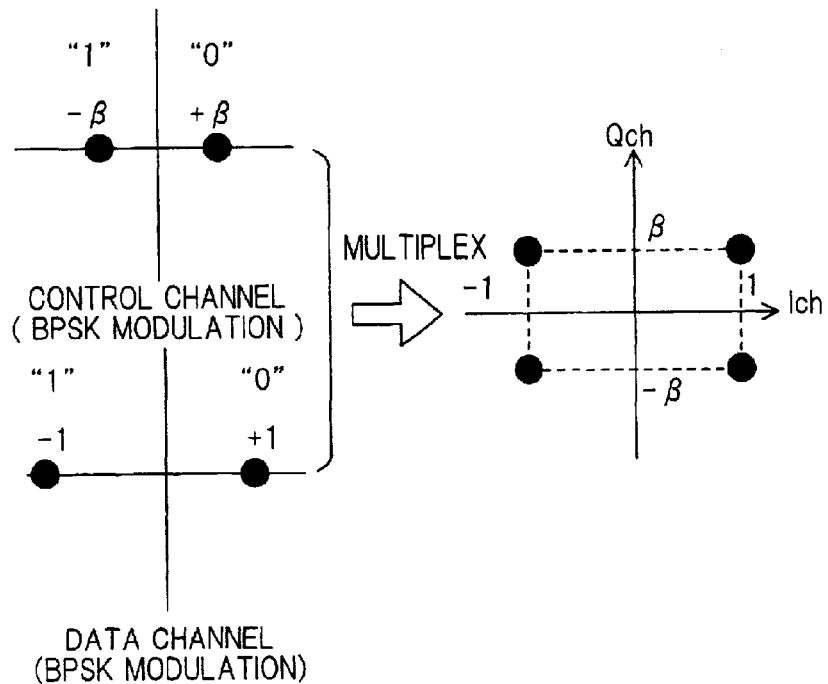
Figure 15:
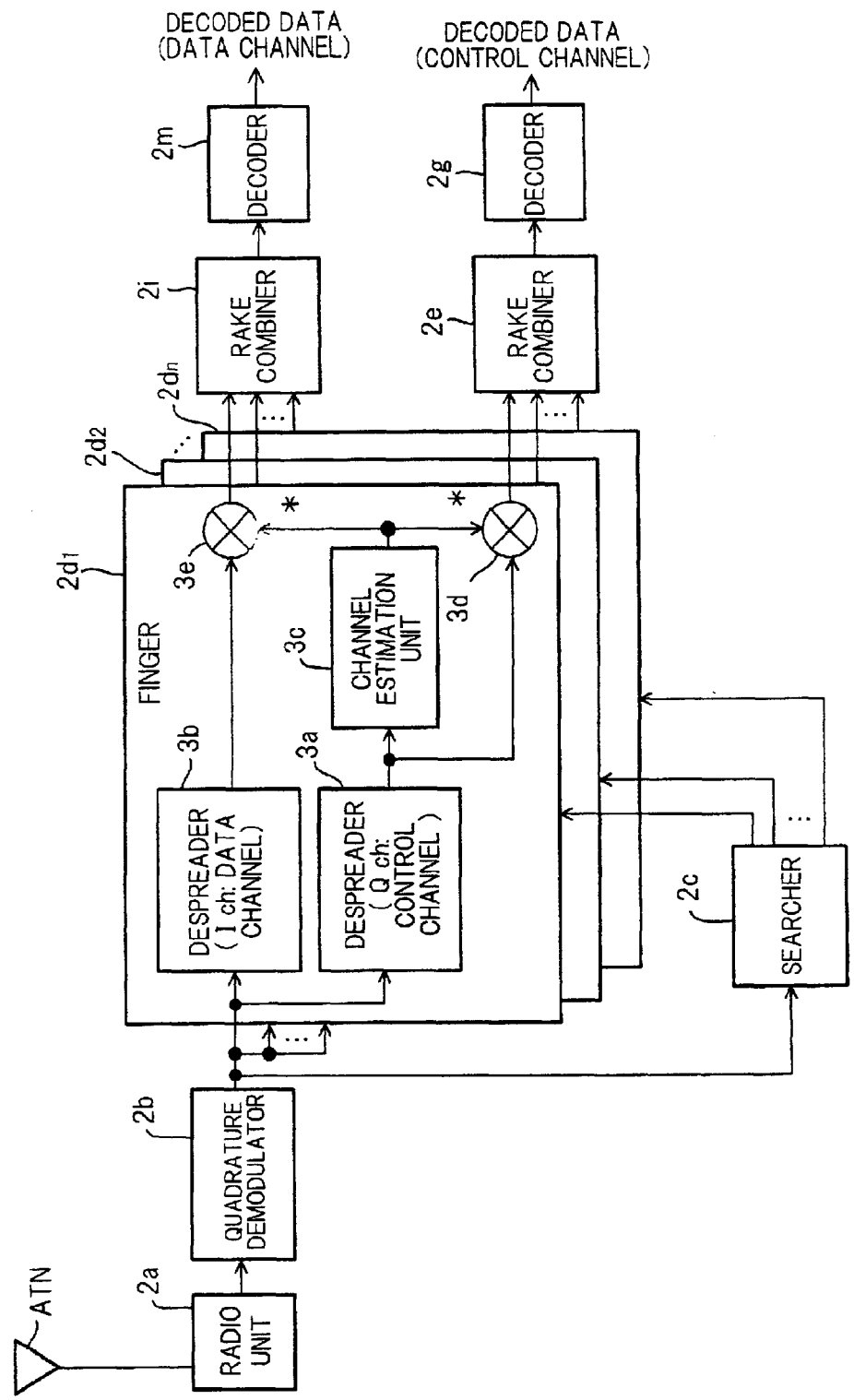
FIG. 15 is a block diagram illustrating one channel of a CDMA receiver section in the CDMA receiver of a base station according to the prior art.

There are instances where a signal on the data channel or control channel is transmitted upon being multiplied by the coefficient βc based upon the magnitudes of the spreading factors of the data channel DPDCH and control channel DPCCH (see FIG. 13). In such case it is required that the coefficient βc be reflected in the interference replica. Accordingly, in the third embodiment, a damping-coefficient decision unit 207 is provided to discriminate the coefficient βc and cause the coefficient βc to be reflected in the interference replica.

Discriminating the coefficient βc involves calculating the power Pd of the data channel and the power Pc of the control channel in the power calculation units 207a, 207b, respectively, and calculating the power ratio Pd/Pc by a power-ratio detector 207c. The power ratio is in 1:1 correspondence with the ratio of the spreading factor of the data channel to the spreading factor of the control channel. Accordingly, a βc discriminator 207d obtains the βc from the power ratio and outputs the βc to a multiplier 207e, and the multiplier 207e multiplies the coefficient βc by the first damping factor α and outputs the product α' to the multiplier 203b of the attenuator 203.

Thus, in accordance with the third embodiment, the damping coefficient α is corrected upon estimating βc based upon the receive power ratio between the data channel and control channel. As a result, it is possible to create a more certain interference replica.

In this embodiment, averaging is not performed by a filter or the like in front of the βc discriminator or in front of the power-ratio detector. However, a method of discriminating βc upon performing averaging by a filter or the like can readily be devised.

(E) Fourth Embodiment

Figure 6:
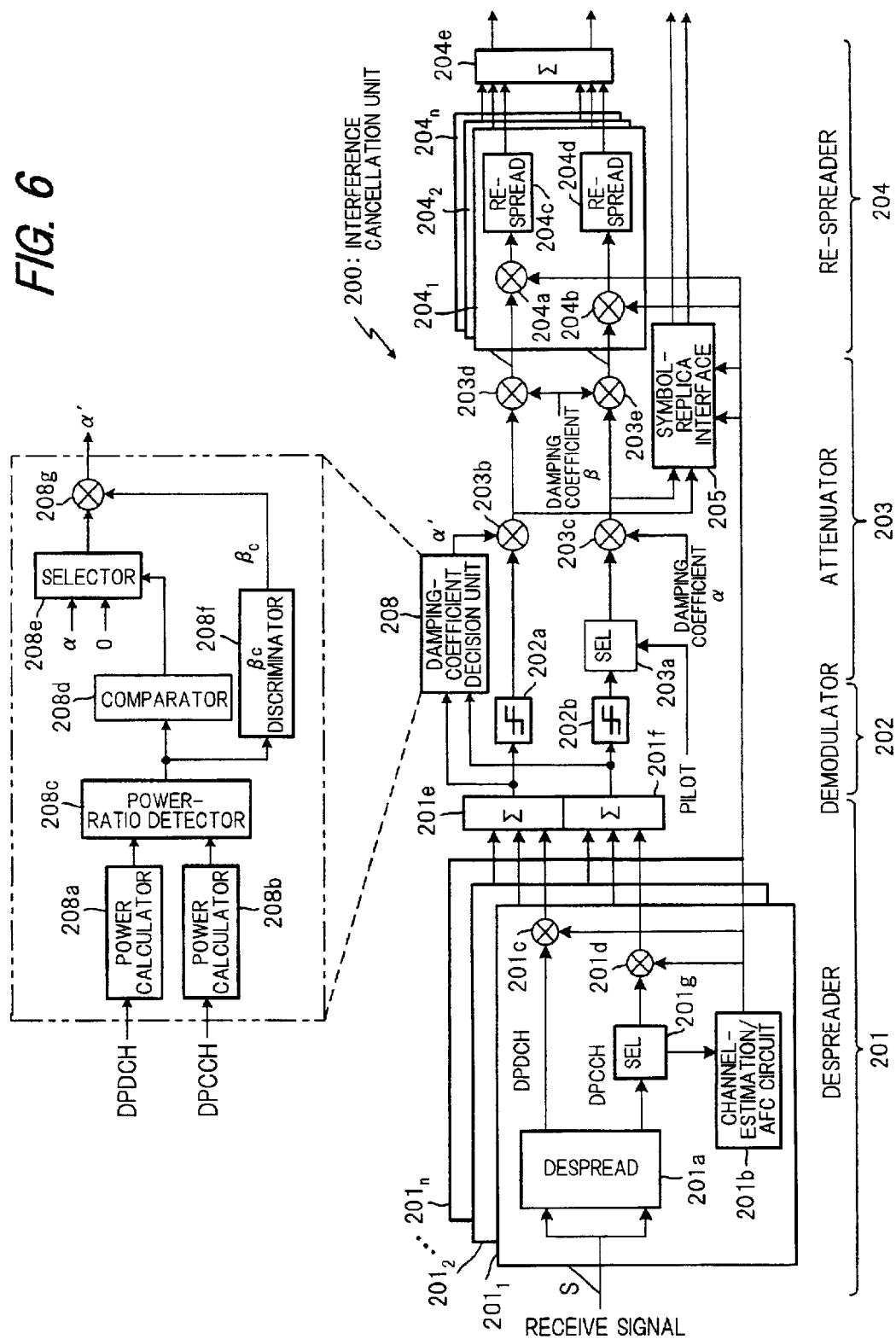
FIG. 6 is a diagram showing the structure of an interference cancellation unit according to a fourth embodiment of the present invention.

FIG. 6 is a diagram showing the structure of an interference cancellation unit according to a fourth embodiment of the present invention, in which components identical with those of the first embodiment in FIG. 1 are designated by like reference characters. The fourth embodiment is a combination of the second and third embodiments and is provided with a damping-coefficient decision unit 208.

The damping-coefficient decision unit 208 includes power calculation units 208a, 208b for calculating the power Pd of the data channel and the power Pc of the control channel, a power-ratio detector 208c for calculating the power ratio Pd/Pc, and a comparator 208d for comparing the power ratio Pd/Pc with a set value in terms of size, deciding that user data has disappeared if the power ratio Pd/Pc is less than the set value, and deciding that user data exists if the power ratio Pd/Pc is equal to or greater than the set value. A selector 208e selects and outputs the first damping coefficient α if user data exists, and selects and outputs 0 if user data does not exist.

A βc discriminator 208f obtains the coefficient βc from the power ratio and outputs βc, and a multiplier 208g multiplies the coefficient βc by the first damping factor α output from the selector 208e and outputs the product α' to the multiplier 203b of the attenuator 203.

In accordance with the fourth embodiment, erroneous removal of interference can be prevented by not carrying out removal of interference in a slot or frame for which it has been determined that user data was not received on the data channel DPDCH. Further, the damping coefficient α is corrected upon estimating βc based upon the receive power ratio between the data channel and control channel.

(F) Fifth Embodiment

Figure 7:
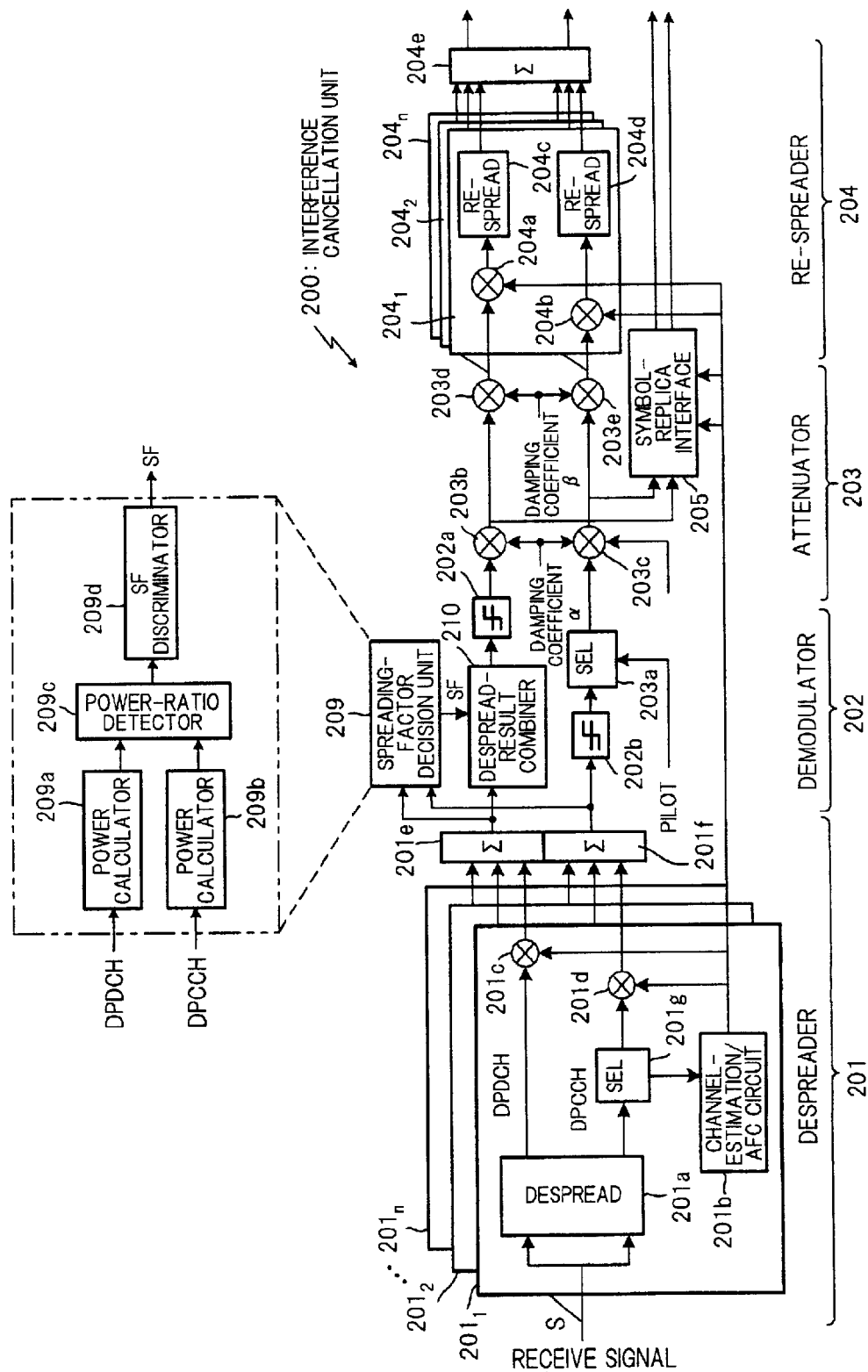
FIG. 7 is a diagram showing the structure of an interference cancellation unit according to a fifth embodiment of the present invention.

FIG. 7 is a diagram showing the structure of an interference cancellation unit according to a fifth embodiment of the present invention, in which components identical with those of the first embodiment in FIG. 1 are designated by like reference characters. In the first embodiment, an interference replica is produced using a code conforming to the minimum spreading factor $SF_{min}$, In the fifth embodiment, however, a spreading-factor decision unit 209 is provided, the spreading factor SF of the data channel is estimated from the ratio of the power on the data channel DPDCH to the power on the control channel DPCCH, and the interference replica is produced using this spreading factor.

The larger the spreading factor, the higher the process gain. Accordingly, in a W-CDMA system, transmission power of the control channel or data channel, whichever is larger, is reduced to lower the total transmission power. In other words, with W-CDMA, the control and data channels are subjected to BPSK modulation to effect spread-spectrum modulation at powers that differ from each other, the spread-spectrum modulated signals are mapped on an I-Q complex plane and multiplexed and the multiplexed signal is transmitted. Further, the spreading factor of the control channel is fixed. Thus, the spreading factor of the data channel can be estimated from the ratio of the receive power of the control channel to the receive power of the data channel.

The spreading-factor decision unit 209 has power calculation units 209a, 209b for calculating the power Pd of the data channel and the power Pc of the control channel, a power-ratio detector 209c for calculating the power ratio Pd/Pc, and an SF discriminator 209d for estimating the spreading factor SF from the power ratio Pd/Pc and outputting the spreading factor SF. It should be noted that a correspondence table of corresponding power ratios Pd/Pc and spreading factors SF can be provided beforehand and the spreading factor SF can be obtained from the table.

A despread-result combiner (second despreader) 210 calculates $$m=SF/SF_{min}$$

using the minimum spreading factor $SF_{min}$ and the estimated spreading factor SF, and integrates the results of despreading m times to generate the despread signal of the receive signal. The demodulator 202a for the data channel demodulates the user data from the despread signal that is output from the despread-result combiner 210.

In accordance with the fifth embodiment, despreading is performed upon estimating the spreading factor SF of the data channel. This makes it possible to produce a precise interference replica.

(G) Sixth Embodiment

Figure 8:
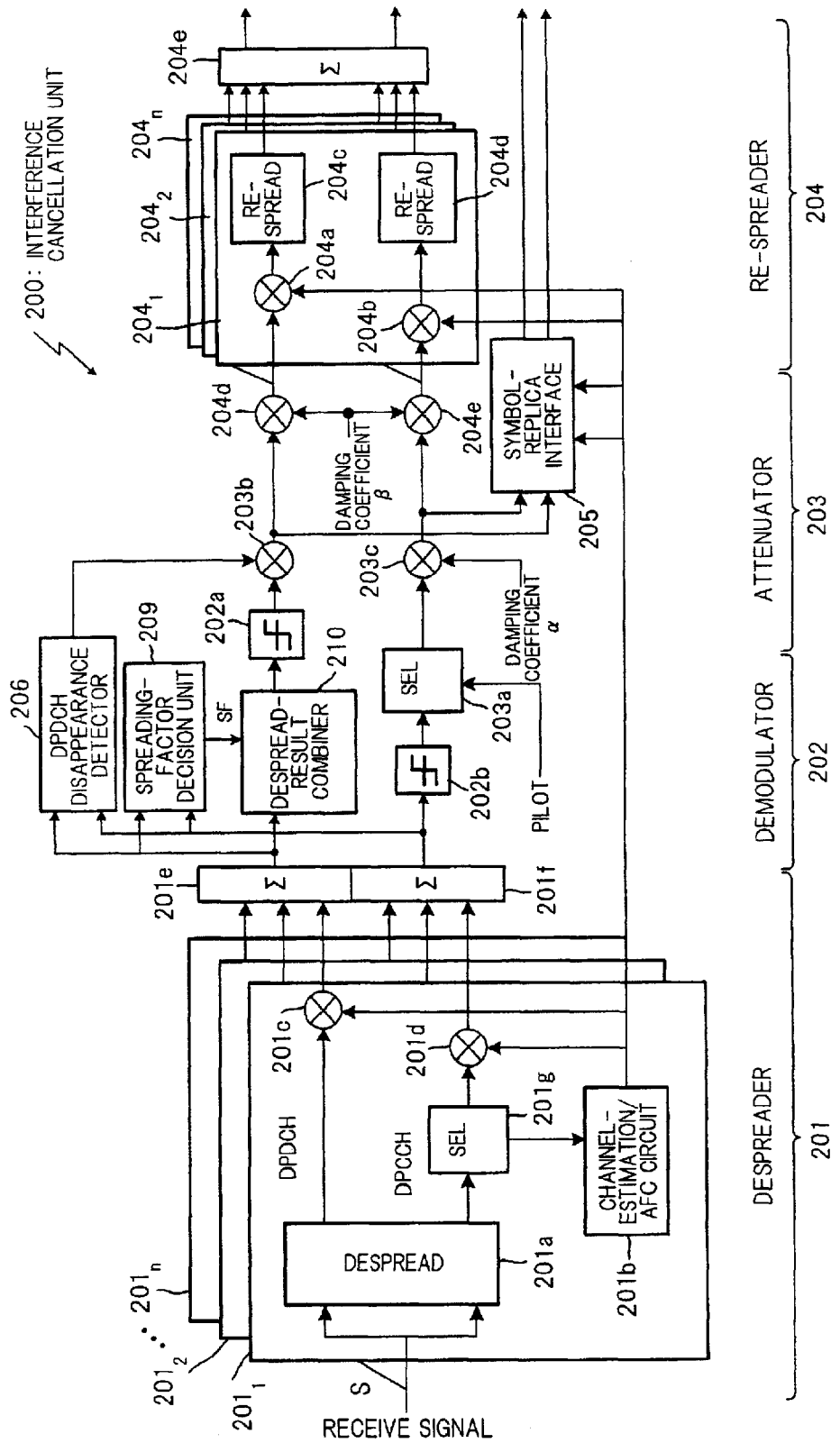
FIG. 8 is a diagram showing the structure of an interference cancellation unit according to a sixth embodiment of the present invention.

FIG. 8 is a diagram showing the structure of an interference cancellation unit according to a sixth embodiment of the present invention. This is a combination of the second and fifth embodiments, in which components identical with those of these embodiments are designated by like reference characters.

In accordance with the sixth embodiment, erroneous removal of interference can be prevented by not carrying out removal of interference in a slot or frame for which it has been determined that user data was not received on the data channel DPDCH. Further, in accordance with the sixth embodiment, despreading is performed upon estimating the spreading factor SF of the data channel. This makes it possible to produce a precise interference replica.

(H) Seventh Embodiment

Figure 9:
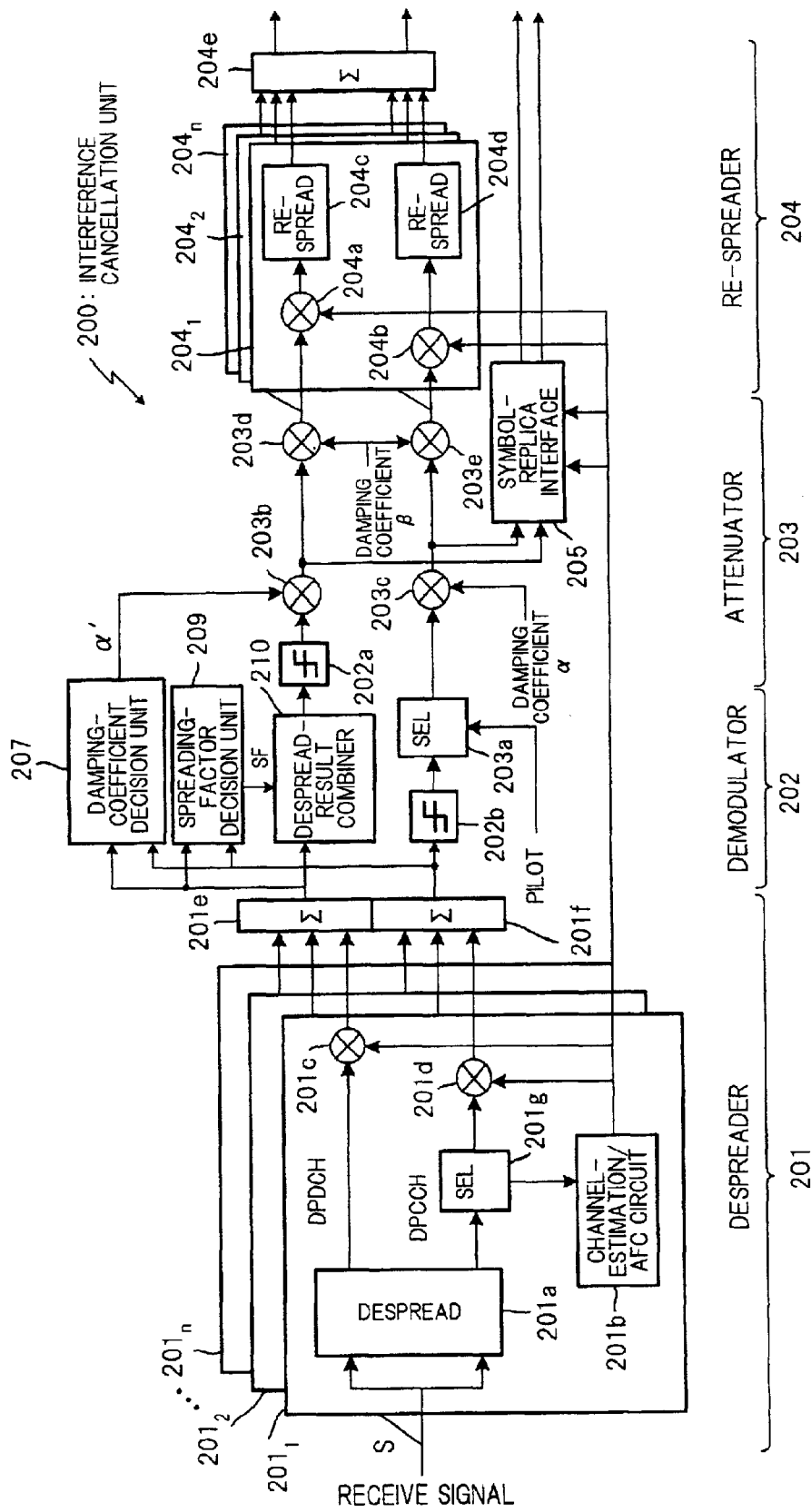
FIG. 9 is a diagram showing the structure of an interference cancellation unit according to a seventh embodiment of the present invention.
Figure 10:
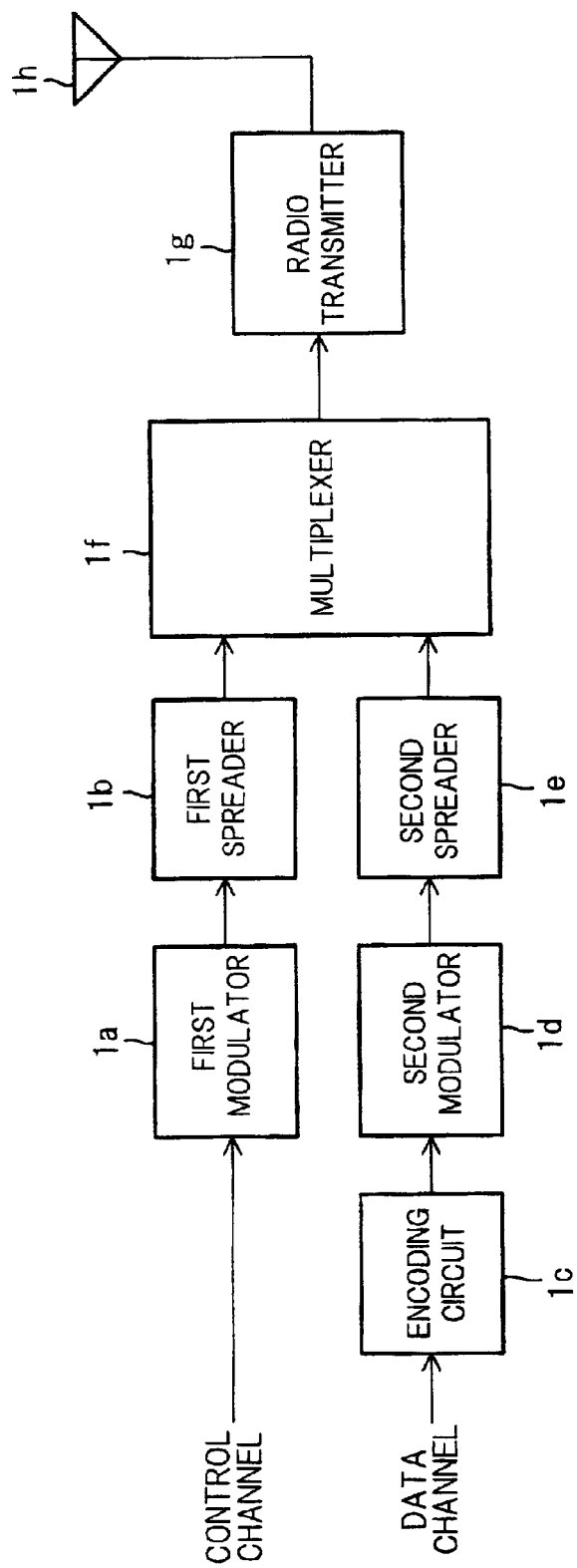
FIG. 10 is a block diagram illustrating the structure of a CDMA transmitter in a mobile station.
Figure 11:
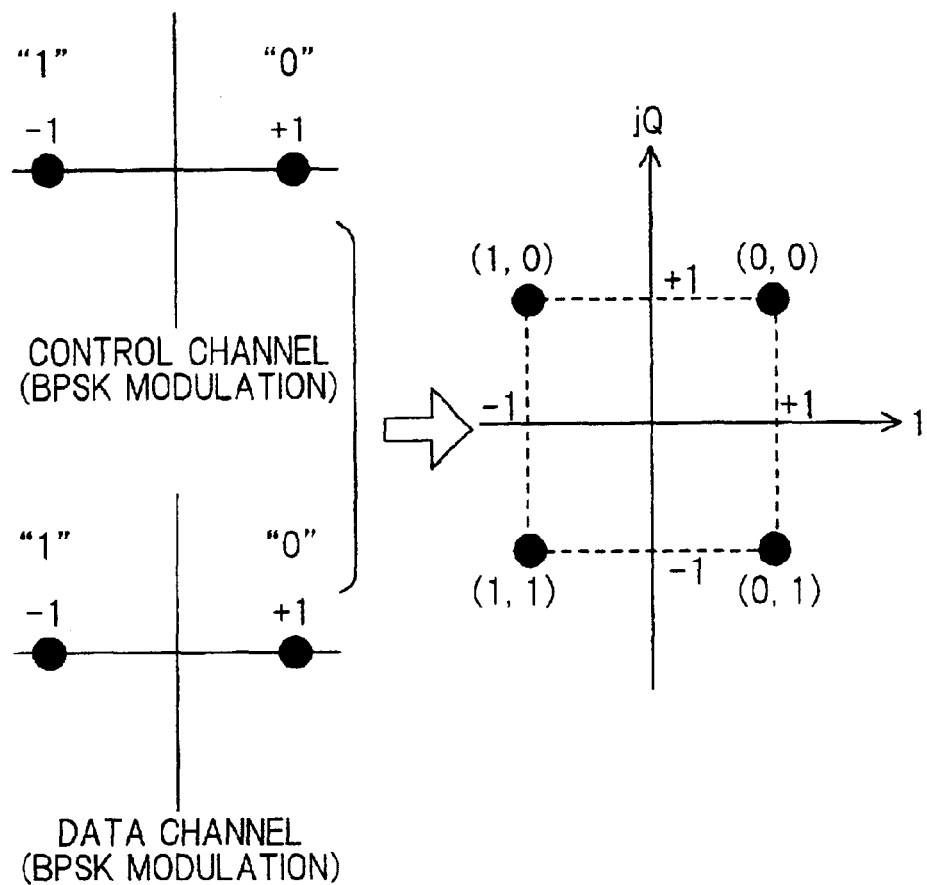
FIG. 11 is a diagram useful in describing BPSK modulation and mapping to an I-Q complex plane according to the prior art.
Figure 12:
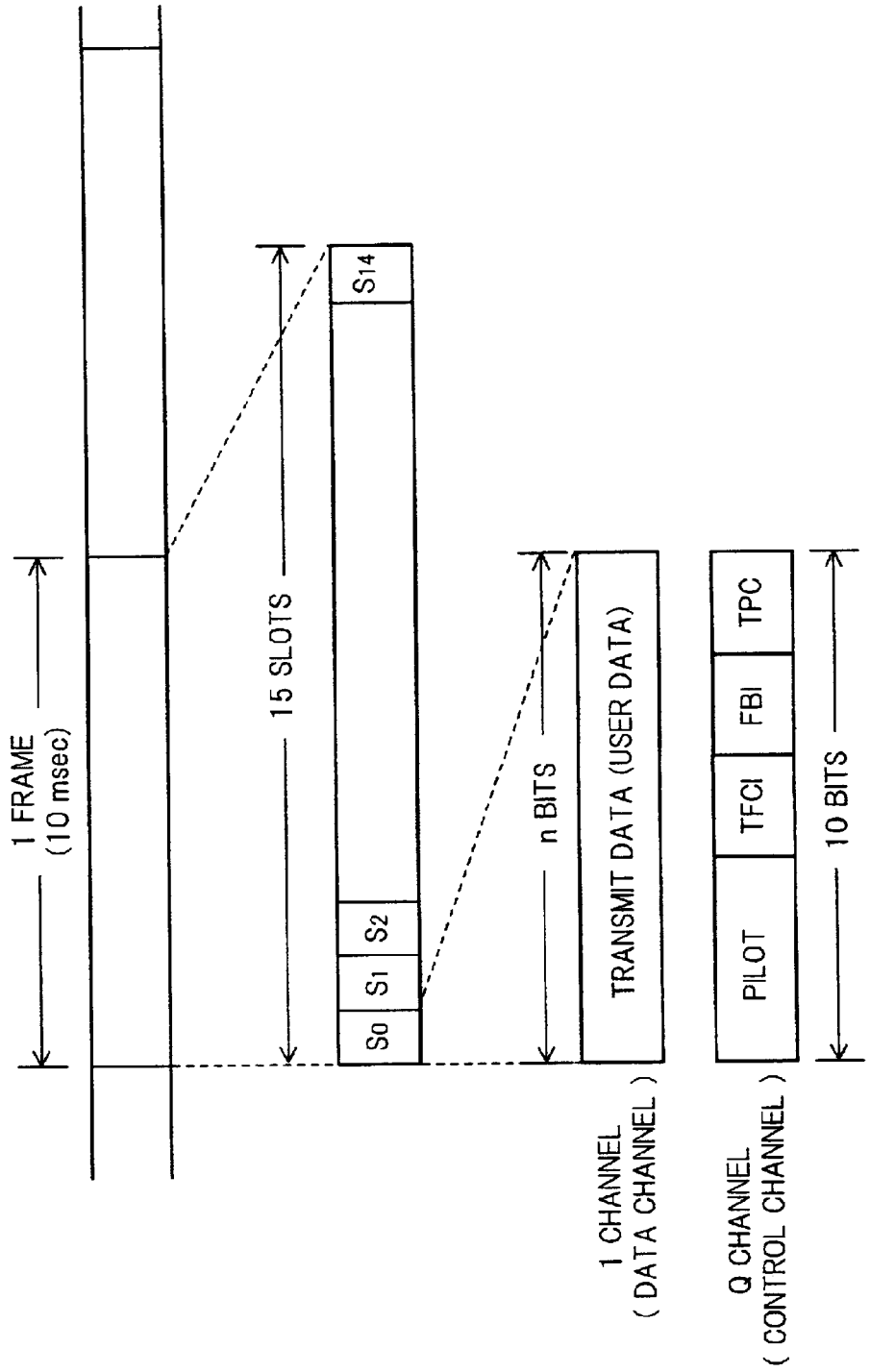
FIG. 12 illustrates the frame format of an uplink frame according to the prior art.

FIG. 9 is a diagram showing the structure of an interference cancellation unit according to a seventh embodiment of the present invention. This is a combination of the third and fifth embodiments, in which components identical with those of these embodiments are designated by like reference characters. It should be noted that the damping-coefficient decision unit 207 can be replaced by the damping-coefficient decision unit 208 of the fourth embodiment.

In accordance with the seventh embodiment, the damping coefficient α is corrected upon estimating βc based upon the ratio of the receive power on the data channel to the receive power on the control channel. As a result, a more reliable interference replica can be created. Further, in accordance with the seventh embodiment, despreading is performed upon estimating the spreading factor SF of the data channel. This makes it possible to produce a precise interference replica.

Thus, in accordance with the present invention, as described above, it is so arranged that a first code is regarded as a code decided based upon a minimum spreading factor, and despreading necessary for interference cancellation is carried out using a despreading code obtained by combining the first code and a second code that differs for every user. As a result, processing for despreading/re-spreading can be executed immediately without the need to decide a spreading code after a spreading factor is discriminated from control information (TFCI bits). This makes it possible to shorten delay time till generation of the interference replica and to reduce delay in the loop of transmission power control.

In accordance with the present invention, the fact that user data is not being transmitted on the data channel DPDCH is detected and, in response, the damping coefficient of the data channel DPDCH is made zero. When data on the data channel DPDCH is not being received, therefore, interference cancellation is not carried out. This makes it possible to prevent erroneous interference cancellation.

In accordance with the present invention, the damping coefficient of the data channel is changed based upon the ratio of receive power on the data channel to receive power on the control channel. As a result, even in a case where a coefficient βc that is based upon the spreading factor of the data channel DPDCH and the spreading factor of the control channel DPCCH on the transmit side is used to multiply the signal on whichever of the channels has the larger spreading factor and the resulting signal is transmitted, the coefficient βc can be reflected in the interference replica. This makes it possible to produce a highly precise interference replica.

In accordance with the present invention, it is so arranged that a highly precise interference replica is generated by estimating the spreading factor SF from the power ratio between the data channel DPDCH and the control channel DPCCH, and producing the interference replica using this estimated spreading factor, which has a higher degree of certainty.

As many apparently widely different embodiments of the present invention can be made without departing from the spirit and scope thereof, it is to be understood that the invention is not limited to the specific embodiments thereof except as defined in the appended claims.

What is claimed is:

1. A spread-spectrum signal receiver apparatus for receiving a spread-spectrum signal and demodulating transmit data from the signal, comprising:
   a receive unit for receiving a spread-spectrum signal that has been spread by a spreading code comprising a combination of a first code that varies depending upon a spreading factor and a second code that differs for every user;
   an interference canceller for producing a replica of an interference signal from the receive signal using a despreading code comprising a combination of the first code, which is regarded as a code decided based upon a minimum spreading factor, and the second code that differs for every user, and generating a signal obtained by subtracting the replica from the receive signal; and
   a demodulator for demodulating transmit data, from the signal from which the replica has been subtracted, by despread processing using a spreading code on the transmit side.

2. The apparatus according to claim 1, wherein said interference canceller includes:
   a despreader for despreading the receive signal using a despreading code comprising a combination of at least the first code decided based upon the minimum spreading factor and the second code that differs for every user;
   a demodulator for demodulating transmit data from the despread signal;
   an attenuator for multiplying the demodulated transmit data by a prescribed damping coefficient; and
   a spreader for generating the replica by spreading the attenuated transmit data using a code identical with the despreading code.

3. The apparatus according to claim 1, wherein the first code decided by the spreading factor is obtained by systematically varying a code that conforms to the minimum spreading factor.

4. An interference cancellation apparatus for receiving a spread-spectrum signal that has been spread by a spreading code comprising a combination of a first code that varies depending upon spreading factor and a second code that differs for every user, and generating a replica of an interference signal from the receive signal, comprising:
   a receiver for receiving the spread-spectrum signal; and
   a replica producing unit for producing a replica of the interference signal from the receive signal using a despreading code comprising a combination of the first code, which is regarded as a code decided based upon a minimum spreading factor, and the second code that differs for every user.

5. The apparatus according to claim 4, wherein said replica producing unit includes:
   a despreader for despreading the receive signal using the despreading code comprising a combination of the first code and the second code that differs for every user;
   a demodulator for demodulating transmit data from the despread signal;
   an attenuator for multiplying the demodulated transmit data by a prescribed damping coefficient;
   a spreader for generating the replica by spreading the attenuated transmit data using a code identical with the despreading code.

6. The apparatus according to claim 5, further comprising a damping-coefficient altering unit for setting the damping coefficient to zero upon detecting that data is not being transmitted.

7. The apparatus according to claim 5, further comprising a damping-coefficient altering unit for altering a damping coefficient of a data channel based upon the ratio of receive-signal power of the data channel to receive-signal power of a control channel, wherein the data and control channels are included in the receive signal.

8. The apparatus according to claim 4, wherein said replica producing unit includes:
   a first despreader for despreading a receive signal using the despreading code comprising the combination of the first code, which is regarded as a code decided based upon a minimum spreading factor, and the second code that differs for every user;
   a spreading-factor estimation unit for estimating the spreading factor (SF) on the transmit side;
   a second despreader for generating a despread signal of the receive signal by integrating, m times, the result of despreading, which is output from said first despreader, based upon the despreading code conforming to the minimum spreading factor, where m (an integer) represents the ratio of the estimated spreading factor to the minimum spreading factor;
   a demodulator for demodulating the transmit data from the despread signal;
   an attenuator for multiplying the demodulated transmit data by a prescribed damping coefficient; and
   a spreader for generating the replica by spreading the attenuated transmit data using a code identical with the despreading code.

9. The apparatus according to claim 8, wherein said spreading-factor estimation unit estimates the spreading factor based upon the ratio of receive-signal power of a data channel to receive-signal power of a control channel, wherein the data and control channels are included in the receive signal.

10. The apparatus according to claim 8, further comprising a damping-coefficient altering unit for setting the damping coefficient of a data channel to zero upon detecting that data is not being transmitted on the data channel.

11. The apparatus according to claim 8, further comprising a damping-coefficient altering unit for altering a damping coefficient of a data channel based upon the ratio of receive-signal power of a data channel to receive-signal power of a control channel.

* * * * *